(12) United States Patent
Nobukata

(10) Patent No.: US 8,370,642 B2
(45) Date of Patent: Feb. 5, 2013

(54) CRYPTOGRAPHIC PROCESSING APPARATUS

(75) Inventor: Hiromi Nobukata, Kanagawa (JP)

(73) Assignee: Sony Corporation, Tokyo (JP)

( * ) Notice: Subject to any disclaimer, the term of this patent is extended or adjusted under 35 U.S.C. 154(b) by 553 days.

(21) Appl. No.: 12/621,620

(22) Filed: Nov. 19, 2009

(65) Prior Publication Data

US 2010/0153744 A1    Jun. 17, 2010

(30) Foreign Application Priority Data

Nov. 20, 2008    (JP) ................ P2008-296411

(51) Int. Cl.
*H04L 9/00*    (2006.01)
*H04L 9/28*    (2006.01)
*H04L 29/06*    (2006.01)

(52) U.S. Cl. ............ 713/189; 380/29; 380/44; 380/255; 713/168

(58) Field of Classification Search .................. None
See application file for complete search history.

(56) References Cited

U.S. PATENT DOCUMENTS

| | | | | |
|---|---|---|---|---|
| 5,442,705 A | * | 8/1995 | Miyano | 380/29 |
| 5,511,123 A | * | 4/1996 | Adams | 380/29 |
| 5,623,548 A | * | 4/1997 | Akiyama et al. | 380/28 |
| 5,745,577 A | * | 4/1998 | Leech | 380/28 |
| 5,949,884 A | * | 9/1999 | Adams et al. | 380/29 |
| 6,182,216 B1 | * | 1/2001 | Luyster | 713/168 |
| 6,199,162 B1 | * | 3/2001 | Luyster | 713/168 |
| 6,272,221 B1 | * | 8/2001 | Tsunoo | 380/28 |
| 6,510,518 B1 | * | 1/2003 | Jaffe et al. | 713/168 |
| 7,071,725 B2 | * | 7/2006 | Fujisaki | 326/8 |
| 7,221,756 B2 | * | 5/2007 | Patel et al. | 380/37 |
| 7,970,129 B2 | * | 6/2011 | Trichina | 380/28 |
| 8,165,288 B2 | * | 4/2012 | Shibutani et al. | 380/28 |
| 2001/0038693 A1 | * | 11/2001 | Luyster | 380/37 |

(Continued)

FOREIGN PATENT DOCUMENTS

| | | |
|---|---|---|
| GB | 2 453 367 | 4/2009 |
| JP | 2000 66585 | 3/2000 |

(Continued)

OTHER PUBLICATIONS

Moore S et al: "Balanced self-checking asynchronous logic for smart card applications" Microprocessors and Microsystems, IPC Business Press LTD. London, GB, vol. 27, No. 9, Oct. 1, 2003, pp. 421-430, XP004453315 ISSN: 0141-9331.

(Continued)

*Primary Examiner* — Philip Chea
*Assistant Examiner* — Dorianne Alvarado David
(74) *Attorney, Agent, or Firm* — Frommer Lawrence & Haug LLP; William S. Frommer; Ellen Marcie Emas

(57) ABSTRACT

A cryptographic processing apparatus includes: at least one register configured to store data for operation; a first operation block configured to execute an operation in accordance with data stored in the register; a second operation block configured to execute a logic operation between one of a register-stored value and a key and an operation result of the first operation block; and a decode block configured to decode binary data in units of the predetermined number of bits to convert the binary data into decode data having the number of bits higher than the number of bits of the binary data.

12 Claims, 25 Drawing Sheets

U.S. PATENT DOCUMENTS

| | | | |
|---|---|---|---|
| 2002/0009196 A1* | 1/2002 | Lim | 380/37 |
| 2002/0027987 A1* | 3/2002 | Roelse | 380/29 |
| 2003/0086564 A1* | 5/2003 | Kuhlman | 380/37 |
| 2003/0093684 A1* | 5/2003 | Kaiserswerth et al. | 713/193 |
| 2003/0191950 A1* | 10/2003 | Patel et al. | 713/189 |
| 2004/0030905 A1* | 2/2004 | Chow et al. | 713/189 |
| 2004/0096059 A1* | 5/2004 | Seo | 380/28 |
| 2004/0233749 A1* | 11/2004 | Fujisaki | 365/202 |
| 2006/0140401 A1* | 6/2006 | Johnson et al. | 380/44 |
| 2006/0177052 A1* | 8/2006 | Hubert | 380/29 |
| 2006/0256963 A1* | 11/2006 | Gebotys | 380/205 |
| 2007/0140478 A1* | 6/2007 | Komano et al. | 380/28 |
| 2008/0143561 A1* | 6/2008 | Miyato et al. | 341/79 |
| 2008/0212776 A1* | 9/2008 | Motoyama | 380/252 |
| 2008/0240426 A1 | 10/2008 | Gueron et al. | |
| 2008/0292100 A1* | 11/2008 | Komano et al. | 380/29 |
| 2009/0003598 A1* | 1/2009 | Itoh et al. | 380/46 |
| 2009/0254759 A1* | 10/2009 | Michiels et al. | 713/189 |
| 2010/0014659 A1* | 1/2010 | Shibutani et al. | 380/28 |
| 2010/0061548 A1* | 3/2010 | Shirai et al. | 380/28 |
| 2010/0272264 A1* | 10/2010 | Goubin et al. | 380/277 |
| 2010/0329450 A1* | 12/2010 | Rarick et al. | 380/29 |
| 2011/0110519 A1* | 5/2011 | Suzaki et al. | 380/255 |
| 2012/0005466 A1* | 1/2012 | Wagner et al. | 713/2 |

FOREIGN PATENT DOCUMENTS

| | | |
|---|---|---|
| JP | 2000 305453 | 11/2000 |
| JP | 2004 347975 | 12/2004 |
| JP | 2004 357314 | 12/2004 |
| JP | 2006 19872 | 1/2006 |
| JP | 2007 251390 | 9/2007 |
| JP | 2008 99204 | 4/2008 |
| JP | 2008 118566 | 5/2008 |
| WO | WO 01 61916 | 8/2001 |
| WO | WO 03/050784 | 6/2003 |

OTHER PUBLICATIONS

Llyod D W et al: "A practical comparison of asynchronous design styles" Asynchronous Circuits and Systems, 2001. ASYNC 2001. Seventh International Symposium on Mar. 11-14, 2001, Piscataway, NJ, USA,IEEE, Mar. 11, 2001, pp. 36-45, XP010537922 ISBN: 978-0-7695-1034-7.

* cited by examiner

FIG. 3A

| Binary (BNDT) | | Decode (DCDT) | | | |
|---|---|---|---|---|---|
| b0 | b1 | d0 | d1 | d2 | d3 |
| 0 | 0 | 1 | 0 | 0 | 0 |
| 1 | 0 | 0 | 1 | 0 | 0 |
| 0 | 1 | 0 | 0 | 1 | 0 |
| 1 | 1 | 0 | 0 | 0 | 1 |

FIG. 3B

| Binary (BNDT) | | Decode (DCDT) | | | |
|---|---|---|---|---|---|
| b0 | b1 | d0 | d1 | d2 | d3 |
| 0 | 0 | 1 | 0 | 0 | 0 |
| 1 | 0 | 0 | 0 | 1 | 0 |
| 0 | 1 | 0 | 1 | 0 | 0 |
| 1 | 1 | 0 | 0 | 0 | 1 |

FIG. 3C

| Binary (BNDT) | | Decode (DCDT) | | | |
|---|---|---|---|---|---|
| b0 | b1 | d0 | d1 | d2 | d3 |
| 0 | 0 | 0 | 1 | 1 | 1 |
| 1 | 0 | 1 | 0 | 1 | 1 |
| 0 | 1 | 1 | 1 | 0 | 1 |
| 1 | 1 | 1 | 1 | 1 | 0 |

FIG.5

| PC | Binary | | Decode | | | |
|---|---|---|---|---|---|---|
| | b1 | b0 | d3 | d2 | d1 | d0 |
| H | - | - | 0 | 0 | 0 | 0 |
| L | 0 | 0 | 0 | 0 | 0 | 1 |
| L | 0 | 1 | 0 | 0 | 1 | 0 |
| L | 1 | 0 | 0 | 1 | 0 | 0 |
| L | 1 | 1 | 1 | 0 | 0 | 0 |

FIG.8

| EXOR | 00 | 01 | 10 | 11 |
|------|----|----|----|----|
| 00   | 00 | 01 | 10 | 11 |
| 01   | 01 | 00 | 11 | 10 |
| 10   | 10 | 11 | 00 | 01 |
| 11   | 11 | 10 | 01 | 00 |

FIG.9

| EXOR | 0000 | 0001 | 0010 | 0100 | 1000 |
|------|------|------|------|------|------|
| 0000 | 0000 | 0000 | 0000 | 0000 | 0000 |
| 0001 | 0000 | 0001 | 0010 | 0100 | 1000 |
| 0010 | 0000 | 0010 | 0001 | 1000 | 0100 |
| 0100 | 0000 | 0100 | 1000 | 0001 | 0010 |
| 1000 | 0000 | 1000 | 0100 | 0010 | 0001 |

CRYPTOGRAPHIC PROCESSING APPARATUS

BACKGROUND OF THE INVENTION

1. Field of the Invention

The present invention relates to a cryptographic processing apparatus and, more particularly, to a cryptographic processing apparatus that is enhanced in the durability against power analysis known as cryptographic analysis processing or attack processing.

2. Description of the Related Art

With IC (Integrated Circuit) cards, the data to be transferred is encrypted in order to prevent the secret information stored in each IC card from being leaked in the course of transfer with a host computer.

A currently most often used encryption method is DES (Data Encryption Standard).

In DES, a same key is shared between the owner of an IC card and the host computer for the encryption of data, the data transmitting side encrypts data by use of this key and transmits the encrypted data, and the data receiving side decrypts the received encrypted data by use of the same key to take out messages.

Consequently, if a malicious third party tries to intercept the data, it is difficult to take out messages unless the third party also has the key.

The key for use in encryption and decryption is stored in such a nonvolatile memory in each IC card as an EEPROM, for example.

Security of the IC card is maintained by employing a configuration in which providing control such that the key data is transferred directly to a cryptographic engine incorporated in the IC card without passing the CPU at the time of encryption and decryption, thereby making it substantially impossible for the owner of the IC card and even IC card developing engineers to take out the key data.

However, an attacking method called DPA (Differential Power Analysis) was reported by P. Kocher, et al., by which the electric current consumption of an IC card is measured and statistical processing is performed on the measurement, thereby taking out the key.

In this DPA attack, an encryption operation can be executed by use of approximately 1,000 different plaintexts to measure the waveforms of consumed electric current, thereby statistically processing the measure consumed electric current to take out the key.

For a method of counteracting the DPA attack, a technology disclosed in Japanese Patent Laid-Open No. 2004-347975, for example, is known.

In the disclosed technology, one-bit data is developed into two-bit values having a same Hamming weight. For the transition of data by an operation, two phases are arranged, an evaluation phase and a precharge phase.

Then, control is executed that transition is first made to a state of neither "0" nor "1" and then to the data obtained after executing the operation, thereby preventing an electric current change involved in the transition of computed values from being detected.

To be more specific, assume that a cryptographic operation is executed with data "0" set to "01" and data "1" set to "10" for example. Then, if the data changes by a round operation, transition is first made to "00" for example and then to the data resulted from the operation.

Namely, if the transition is expressed as follows, the transition of each bit based on the operation caused a change of only one bit for all transitions regardless of an operation result, thereby making it difficult to get the key from an electric current change.

Transition from "0" to "0": "01" to "00" to "01"
Transition from "0" to "1": "01" to "00" to "10"
Transition from "1" to "0": "10" to "00" to "01"
Transition from "1" to "1": "10" to "00" to "10"

SUMMARY OF THE INVENTION

However, the above-mentioned related-art method demands a configuration in which a complementary operation for two bits must be executed in each circuit executing a cryptographic operation. Consequently, this configuration at least doubles the circuit scale, which, in turn, doubles the electric current consumption because one of the extended two bits always operates as a circuit.

Therefore, embodiments of the present invention addresses the above-identified and other problems associated with related-art methods and apparatuses and solves the addressed problems by providing a cryptographic processing apparatus configured to suppress the increase in the circuit scale of an encryption operation circuit and the generation of the leak current at the time of operation of the circuit thereby making it difficult to attempt electric current analysis.

In carrying out embodiments of the invention, there is provided a cryptographic processing apparatus. This cryptographic processing apparatus has at least one register configured to store data for operation; a first operation block configured to execute an operation in accordance with data stored in the register; a second operation block configured to execute a logic operation between one of a register-stored value and a key and an operation result of the first operation block; and a decode block configured to decode binary data in units of the predetermined number of bits to convert the binary data into decode data having the number of bits higher than the number of bits of the binary data. In this configuration, an operation result of the second operation block is stored in the register and the decode block is arranged such that data propagating along a signal wiring from a supply block of at least one of register-stored value and a round key and the first operation block to the second operation block is supplied in a state where binary data is decoded in units of the predetermined number of bits to be converted into decode data having the number of bits higher than the number of bits of the bindery data.

According to embodiments of the present invention, a configuration is used in which decode values are used for data to be propagated along signal wiring and an operation is executed with decode values in an operation block.

Consequently, the leak currents on the signal wiring and in the operation block are minimized to enhance DPA resistance.

Embodiments of the present invention can suppress the increase in the circuit scale of the encryption operation circuit and the generation of leak currents at the time of operation, thereby making difficult the attempts of electric current analysis.

BRIEF DESCRIPTION OF THE DRAWINGS

Other objects and aspects of the invention will become apparent from the following description of embodiments with reference to the accompanying drawings in which:

FIGS. 3A, 3B, and 3C are diagrams each illustrating, in a table, a relation between binary data and decode data in the case of two-bit data;

FIG. 5 is a truth table of the decode block shown in FIG. 4;

FIG. 8 is a truth table of an EXOR (Exclusive-OR) operation of two-bit binary data;

FIG. 9 is a truth table of an EXOR operation of two-bit decode data;

DETAILED DESCRIPTION OF THE PREFERRED EMBODIMENTS

This invention will be described in further detail by way of embodiments thereof with reference to the accompanying drawings. It should be noted that the description of the embodiments will be made in the following order:

(1) A first embodiment (a first exemplary configuration of a DES operation circuit)

(2) A second embodiment (a second exemplary configuration of a DES operation circuit (3) A third embodiment (an exemplary configuration of an AES operation circuit)

(4) A fourth embodiment (a third exemplary configuration of a DES operation circuit)

With the cryptographic processing apparatuses of the present embodiments of the invention, data obtained by decoding data with two or more bits is used for operations.

The Hamming weight of each decode value is constant.

In the first point of view, with the cryptographic processing apparatuses of the first through third embodiments, a configuration is employed in which the data to be transmitted along signal wirings is a decoded and this decoded value is encoded at the input end of a register and a function operation circuit to be operated on a binary basis, the resultant data being decoded at the output end. The output of an Sbox is decoded with the output bits of different sub Sboxes.

In the second point of view, in the fourth embodiment, input data (a plaintext or ciphertext) is decoded, a cryptographic operation is all executed by the decode value, the decoded data is encoded after the operation, thereby providing output data (ciphertext or plaintext).

In the first through third embodiments and the fourth embodiment, one round of operation cycle is made up of a precharge phase and an evaluation phase.

(1) The First Embodiment

Figure 1:
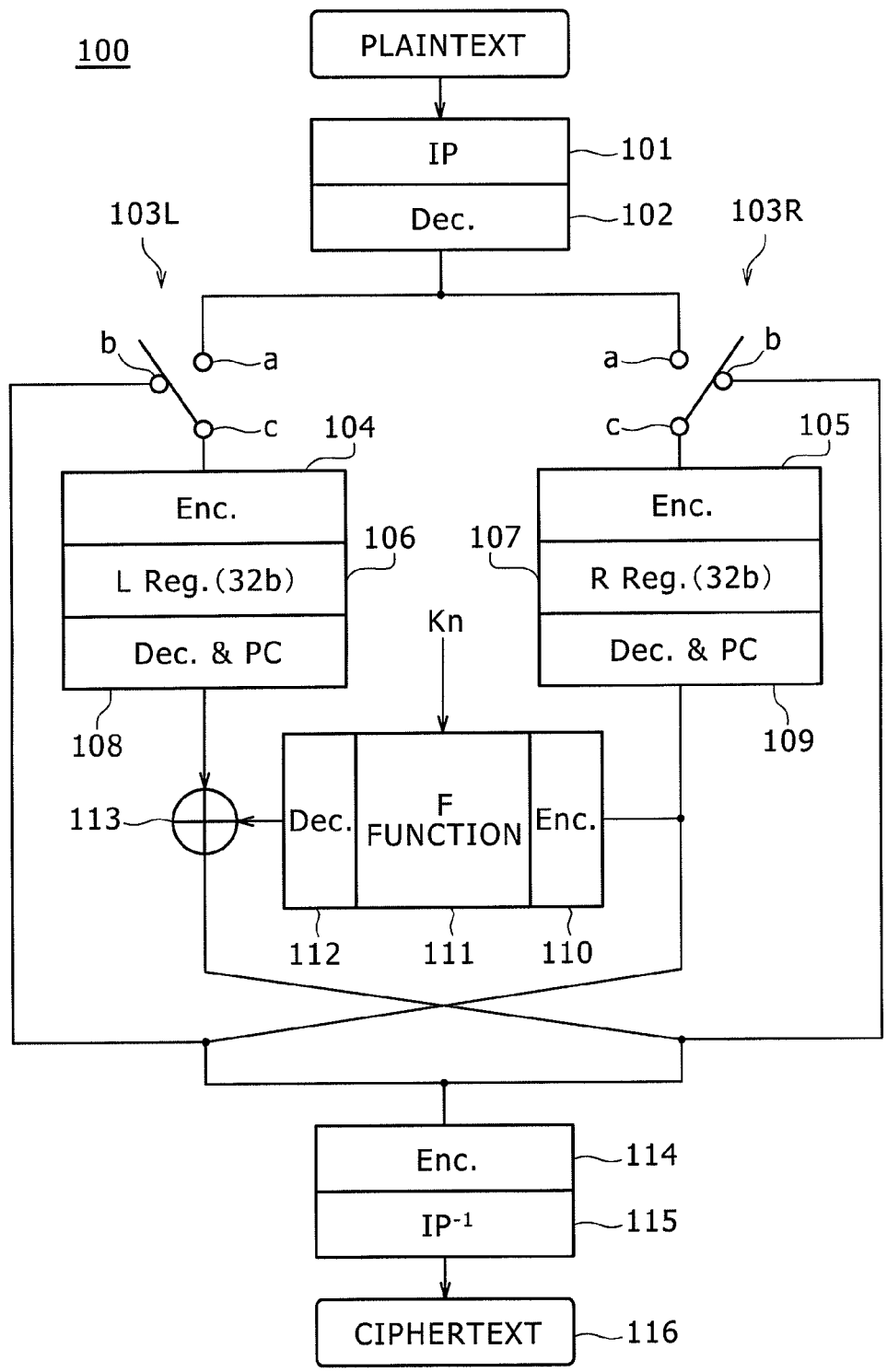
FIG. 1 is a diagram illustrating an exemplary configuration of a DES operation circuit as a cryptographic processing apparatus practiced as one embodiment of the invention.

Referring to FIG. 1, there is shown an exemplary configuration of a DES operation circuit as a cryptographic processing apparatus practiced as the first embodiment of the invention.

This DES operation circuit 100 has an IP (Initial Permutation) block 101, a first decode (Dec) block 102, switches (SW) 103L, 103R, a first encode (Enc) block 104, and a second encode (Enc) block 105.

In addition, the DES operation circuit 100 has an L register (L Reg) 106 as a first register, an R register (R Reg) 107 as a second register, a first decode and precharge control block (Dec & PC) 108, and a second decode and precharge control block 109.

Further, the DES operation circuit 100 has a third encode block 110, an F function block 111, a second decode block 112, an EXOR operation block 113, a fourth encode block 114, an inverse permutation block ($IP^{-1}$) 115, and a ciphertext output block 116.

The decode block 102 decodes the binary data of a plaintext IP-permutated in the initial permutation block 101 in units of predetermined number of bits, thereby converting the binary data into decode data.

The decode block 102 outputs decode data to the first encode block 104 and the second encode block 105 via the switches 103L, 103R. The decode processing of the embodiment is described later.

An active contact a of the switch 103L is connected to the output of the decode block 102, an active contact b is connected to the second decode and precharge control block 109, the third encode block 110, and the fourth encode block 114, and a fixed contact c is connected to the input of the first encode block 104.

An active contact a of the switch 103R is connected to the output of the first decode block 102, an active contact b is connected to the output of the EXOR operation block 113 and the fourth encode block 114, and a fixed contact c is connected to the second encode block 105.

The first encode block 104 encodes the data decoded by the first decode block 102 or decoded by the second decode and precharge control block 109 into binary data and outputs this binary data to the L register 106.

The second encode block 105 encodes the data decoded by the first decode block 102 or an operation result of the EXOR operation block 113 into binary data and outputs this binary data to the R register 107.

In synchronization with a latch pulse that is a data capture signal, the L register 106 latches (or stores) 32-bit data for example encoded by the first encode block 104.

In synchronization with a latch pulse that is a data capture signal, the R register 107 latches (or stores) 32-bit data for example encoded by the second encode block 105.

The first decode and precharge control block 108 decodes the binary data latched in the L register 106 in units of predetermined number of bits and supplies a decode value or a precharge value obtained by a logic operation with a precharge control signal PC to one of the inputs of the EXOR operation block 113.

The second decode and precharge control block 109 decodes the binary data latched in the R register 107 in units of predetermined number of bits and outputs a decode value or a precharge value obtained by a logic operation with a precharge control signal PC to the third encode block 110.

The third encode block 110 encodes the decode value obtained by the second decode and precharge control block 109 into binary data and outputs this binary data to the F function block 111.

The F function block 111 executes an F function operation using key Kn on the binary data obtained by the third encode block 110. For example, the F function block 111 forms a first operation block.

Figure 2:
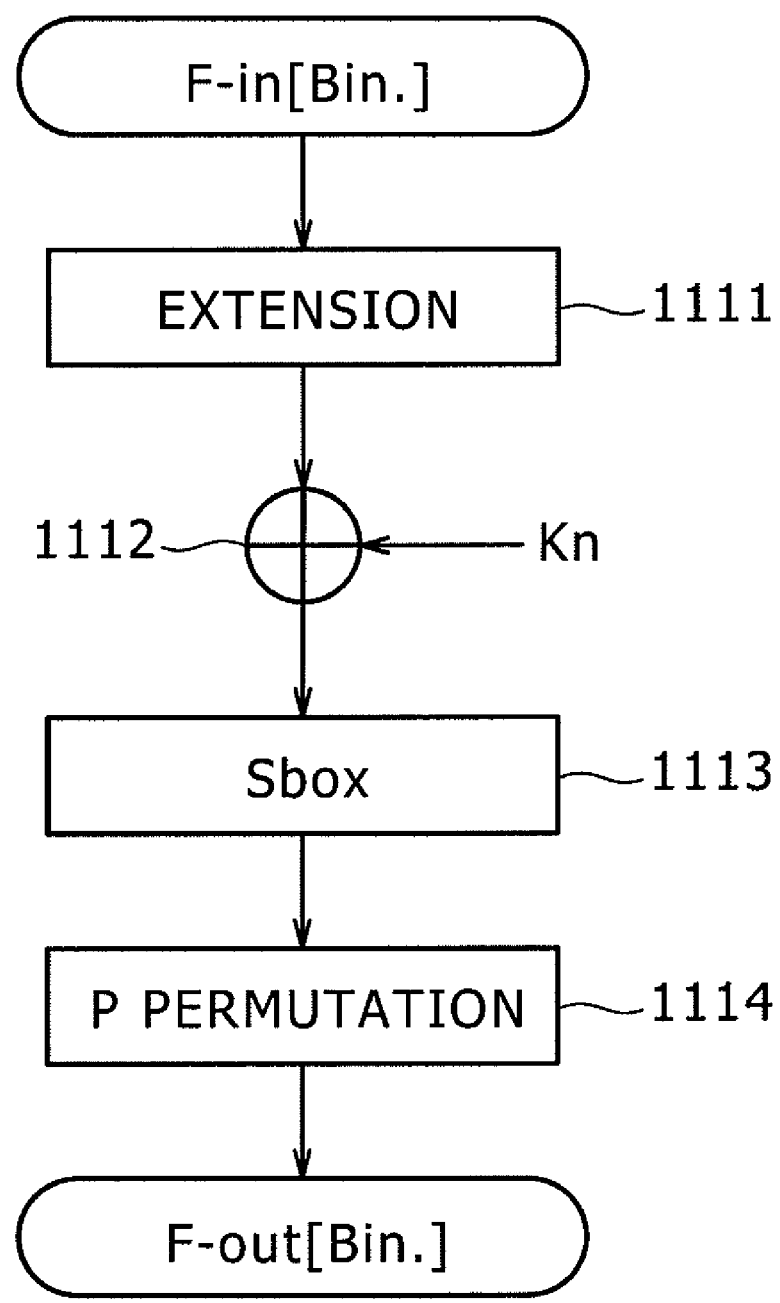
FIG. 2 is a diagram illustrating an exemplary configuration of an F function block.

Referring to FIG. 2, there is shown an exemplary configuration of the F function block 111.

The F function block 111 shown in FIG. 2 has a extension section 1111, an EXOR operation section 1112, an Sbox 1113, and a P permutation section 1114.

The extension section 1111 executes an extension processing (or a bit extension processing) on the latch data in the R register 107 encoded into binary data by the third encode block 110 and supplies the extended data to one of the inputs of the EXOR operation section 1112.

The EXOR operation section 1112 executes an EXOR (exclusive OR) operation between the output data of the extension section 1111 and a round key (the same number of bits as extended bits) Kn and outputs an operation result to the Sbox 1113.

The Sbox 1113 executes nonlinear conversion processing on an operation result of the EXOR operation section 1112.

The Sbox 1113 executes nonlinear processing from 48 bits to 32 bits by use of a conversion table for example.

The P permutation section 1114 permutates the bit positions of output data of the Sbox 1113 and outputs a result of the permutation to the second decode block 112.

The second decode block 112 decodes output binary data (the output of the P permutation section 1114) of the F function block 111 in units of predetermined number of bits and supplies the decoded data to the other input of the Sbox EXOR operation block 113.

The EXOR operation block 113 executes an EXOR (an exclusive OR) operation between the latch data in the L register 106 decoded by the first decode and precharge control block 108 and the data from the P permutation section 1114 decoded by the second decode block 112.

For example, the EXOR operation block 113 forms the second operation block.

The fourth encode block 114 encodes the decoded operation result obtained after the round operation into binary data and outputs this binary data to the inverse permutation block 115.

The inverse permutation block 115 executes inverse permutation ($IP^{-1}$) on the binary data obtained by the encoding by the fourth encode block 114 and outputs the resultant data as a ciphertext via the ciphertext output block 116.

The cryptographic processing apparatus of the present embodiment having the above-mentioned configuration has features for decoding and encoding data and therefore is capable of suppressing the increase in the circuit scale of the encryption operation circuit and the occurrence of a leak current at the time of operation, thereby making it difficult to execute electric current analysis.

The following describes, in detail, the decode function and the encode function of the present embodiment.

First, decode values are explained.

In what follows, an example is used in which 2-bit data for example is decoded.

FIGS. 3A through 3C show relations between binary data and decode data in the form of tables in the case of 2-bit data.

In this example, the decode block decodes 2-bit binary data BNDT into 4-bit data.

In the decoding methods shown in FIGS. 3A and 3B, four pieces of decode data obtained by the decoder each always have "1" in different positions, "0"s filled in the other positions.

Alternatively, in the decoding method shown in FIG. 3C, four pieces of decode data DCDT obtained by the decoder each always have "0" in different positions, "1"s filled in the other positions.

In the decoding method shown in FIG. 3A, decode processing is executed as follows:

if two bits ($b1$, $b0$) of binary data BNDT are (0, 0), then four bits ($d3$, $d2$, $d1$, $d0$) of decode data DCDT are decoded as (0, 0, 0, 1);

if two bits ($b1$, $b0$) of binary data BNDT are (0, 1), then four bits ($d3$, $d2$, $d1$, $d0$) of decode data DCDT are decoded as (0, 0, 1, 0);

if two bits ($b1$, $b0$) of binary data BNDT are (1, 0), then four bits ($d3$, $d2$, $d1$, $d0$) of decode data DCDT are decoded as (0, 1, 0, 0); and if two bits ($b1$, $b0$) of binary data BNDT are (1, 1), then four bits ($d3$, $d2$, $d1$, $d0$) of decode data DCDT are decoded as (1, 0, 0, 0).

In the decoding method shown in FIG. 3B, decode processing is executed as follows:

if two bits ($b1$, $b0$) of binary data BNDT are (0, 0), then four bits ($d3$, $d2$, $d1$, $d0$) of decode data DCDT are decoded as (0, 0, 0, 1);

if two bits ($b1$, $b0$) of binary data BNDT are (0, 1), then four bits ($d3$, $d2$, $d1$, $d0$) of decode data DCDT are decoded as (0, 1, 0, 0);

if two bits ($b1$, $b0$) of binary data BNDT are (1, 0), then four bits ($d3$, $d2$, $d1$, $d0$) of decode data DCDT are decoded as (0, 0, 1, 0); and if two bits ($b1$, $b0$) of binary data BNDT are (1, 1), then four bits ($d3$, $d2$, $d1$, $d0$) of decode data DCDT are decoded as (1, 0, 0, 0).

In the decoding method shown in FIG. 3C, decode processing is executed as follows:

if two bits ($b1$, $b0$) of binary data BNDT are (0, 0), then four bits ($d3$, $d2$, $d1$, $d0$) of decode data DCDT are decoded as (1, 1, 1, 0);

if two bits (b1, b0) of binary data BNDT are (0, 1), then four bits (d3, d2, d1, d0) of decode data DCDT are decoded as (1, 1, 0, 1);

if two bits (b1, b0) of binary data BNDT are (1, 0), then four bits (d3, d2, d1, d0) of decode data DCDT are decoded as (1, 0, 1, 1); and if two bits (b1, b0) of binary data BNDT are (1, 1), then four bits (d3, d2, d1, d0) of decode data DCDT are decoded as (0, 1, 1, 1).

In the case of decoding 2-bit data, there are 4!=24 patterns, any one of which may be used. Namely, not only the decoding method of FIG. 3A, but also the decoding method of FIG. 3B may be used. Alternatively, any other methods may be used; namely, as with the example shown in FIG. 3C, the case in which each "0" is set in different positions, "1"s filled in the other positions.

The following describes a decode block and an encode block that correspond to the decoding method shown in FIG. 3A.

Figure 4:
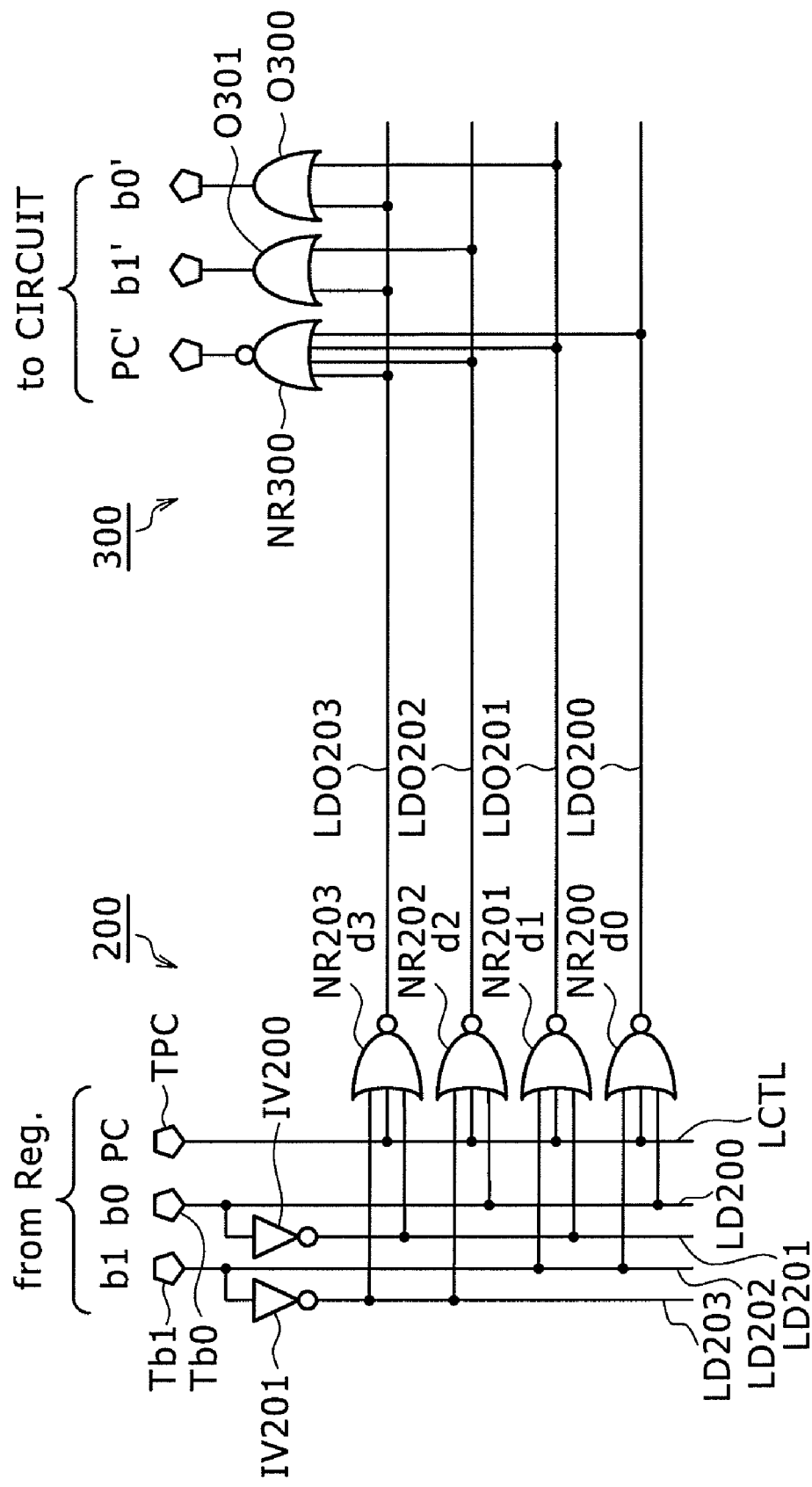
FIG. 4 is a circuit diagram illustrating an exemplary configuration of a decode block and an encode block corresponding to a decode method shown in FIG. 3A.

Referring to FIG. 4, there is shown an exemplary configuration of the a decode block and an encode block that correspond to the decoding method shown in FIG. 3A.

FIG. 5 shows a truth table of the decode block shown in FIG. 4.

It should be noted that the circuit configuration shown in FIG. 4 is applicable to the second decode and precharge control block 109 and the third encode block 110 shown in FIG. 1, for example.

Also, the circuit configuration shown in FIG. 4 is basically applicable to the first decode block 102, the first encode block 104, the first decode block 102, and the second encode block 105, except for the precharge control signal PC.

A decode block 200 shown in FIG. 4 has 3-input NOR gates NR200 through NR203, inverters IV200, IV201, decode lines LD200 through LD203, a control line LCTL, and decode output lines LDO200 through LDO203 as signal lines.

Further, the decode block 200 has an input terminal Tb0 of bit b0 of binary data BNDT, an input terminal Tb1 of bit b1, and an input terminal TPC of precharge control signal PC.

The decode line LD200 is connected to the input terminal Tb0, the decode line LD201 is connected to the output terminal of the inverter IV200, and the input terminal of the inverter IV200 is connected to the input terminal Tb0.

The decode line LD202 is connected to the input terminal Tb1, the decode line LD203 is connected to the output terminal of the inverter IV201, and the input terminal of the inverter IV201 is connected to the input terminal Tb1.

The control line LCTL is connected to the input terminal TPC.

A first input terminal of the NOR gate NR200 is connected to the decode line LD200, a second input terminal is connected to the control line LCTL, and a third input terminal is connected to the decode line LD202. The output terminal of the NOR gate NR200 is connected to the decode output line LDO200.

A first input terminal of the NOR gate NR201 is connected to the decode line LD201, a second input terminal is connected to the control line LCTL, and a third input terminal is connected to the decode line LD202. The output terminal of the NOR gate NR201 is connected to the decode output line LDO201.

A first input terminal of the NOR gate NR202 is connected to the decode line LD200, a second input terminal is connected to the control line LCTL, and a third input terminal is connected to the decode line 203. The output terminal of the NOR gate NR202 is connected to the decode output line LDO202.

A first input terminal of the NOR gate NR203 is connected to the decode line LD201, a second input terminal is connected to the control line LCTL, and a third input terminal is connected to the decode line 203. The output terminal of the NOR gate NR203 is connected to the decode output line LDO203.

An encode block 300 has 2-input OR gates O300, O301, and a 4-input NOR gate NR300.

A first input terminal of an OR gate O300 is connected to the decode output line LDO201 and a second input terminal is connected to the decode output line LDO203.

A first input terminal of an OR gate O301 is connected to the decode output line LDO202 and a second input terminal is connected to the decode output line LDO203.

A first input terminal of an NOR gate NR300 is connected to the decode output line LDO200 and a second input terminal is connected to the decode output line LDO201. A third input terminal of the NOR gate NR300 is connected to the decode output line LDO202 and a fourth input terminal is connected to the decode output line LDO203.

The decode block 200 generates inverted bit data from the 2-bit binary data BNDT and supplies data that is a total of four bits made up of input two bits and inverted bit data thereof to the corresponding NOR gate, thereby generating 4-bit decode data d0, d1, d2, and d3.

The encode block 300 is configured by basically arranging two 2-input NOR gates for 4-bit decode data.

For the encoding of bit data, decode data d0 is not used. For the generation of bit b0', a result of an OR operation between decode data d1 and d3 is applied. For the generation of bit b1', a result of an OR operation between decode data d2 and d3 is applied.

The following describes a basic operation of the circuit shown in FIG. 4 having the above-mentioned configuration.

Figure 6:
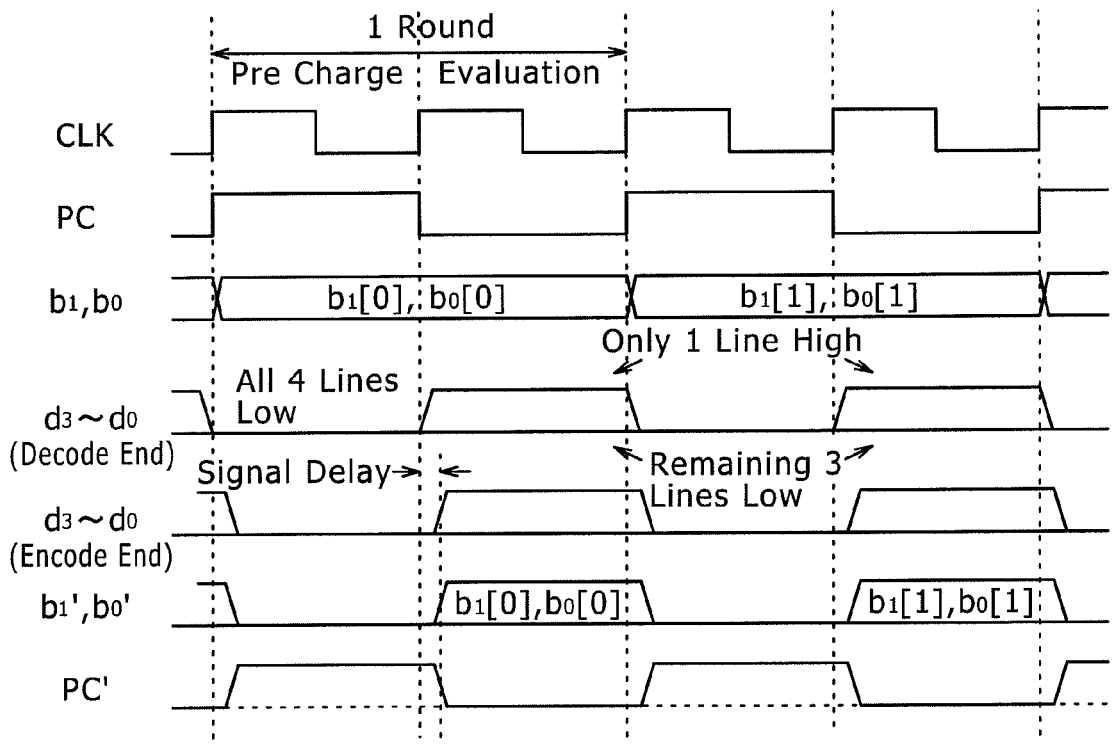
FIG. 6 is a timing chart of the circuit shown in FIG. 4.

Referring to FIG. 6, there is shown a timing chart of the circuit shown in FIG. 4.

A precharge control signal PC is a signal for controlling a precharge operation.

When the precharge control signal is active high level (H), decoded data d0 through d3 all go low level (0) as shown in FIG. 5 and FIG. 6, being indicative of a precharge state.

When the precharge control signal PC goes low level (L) into an evaluation phase, only one decode output line selected in accordance with 2-bit data goes high.

Then, when the precharge control signal PC goes high into a precharge phase, only the data (or the signal) of one decode output line selected in accordance with 2-bit data goes low.

Consequently, when transition is made to an evaluation phase, only one decode output line goes high and, when transition is made to a precharge phase, only one decode output line thereof goes low, thereby precharging all decode output lines to low level.

In the encode block 300 at the decode output line (signal wiring) end, "b1'" is generated by an OR operation between "d3" and "d2" and "b0'" is generated by an OR operation between "d3" and "d1."

It should be noted that "'" denotes a slightly different timing from "b1" and "b0" due to signal delay although logic is the same.

"PC'" is indicative of a precharge control signal in a delay signal; when the decode value (b1', b0')=(0, 0), this precharge control signal makes distinction between data and precharge value and is used for phase control inside function.

Figure 7:
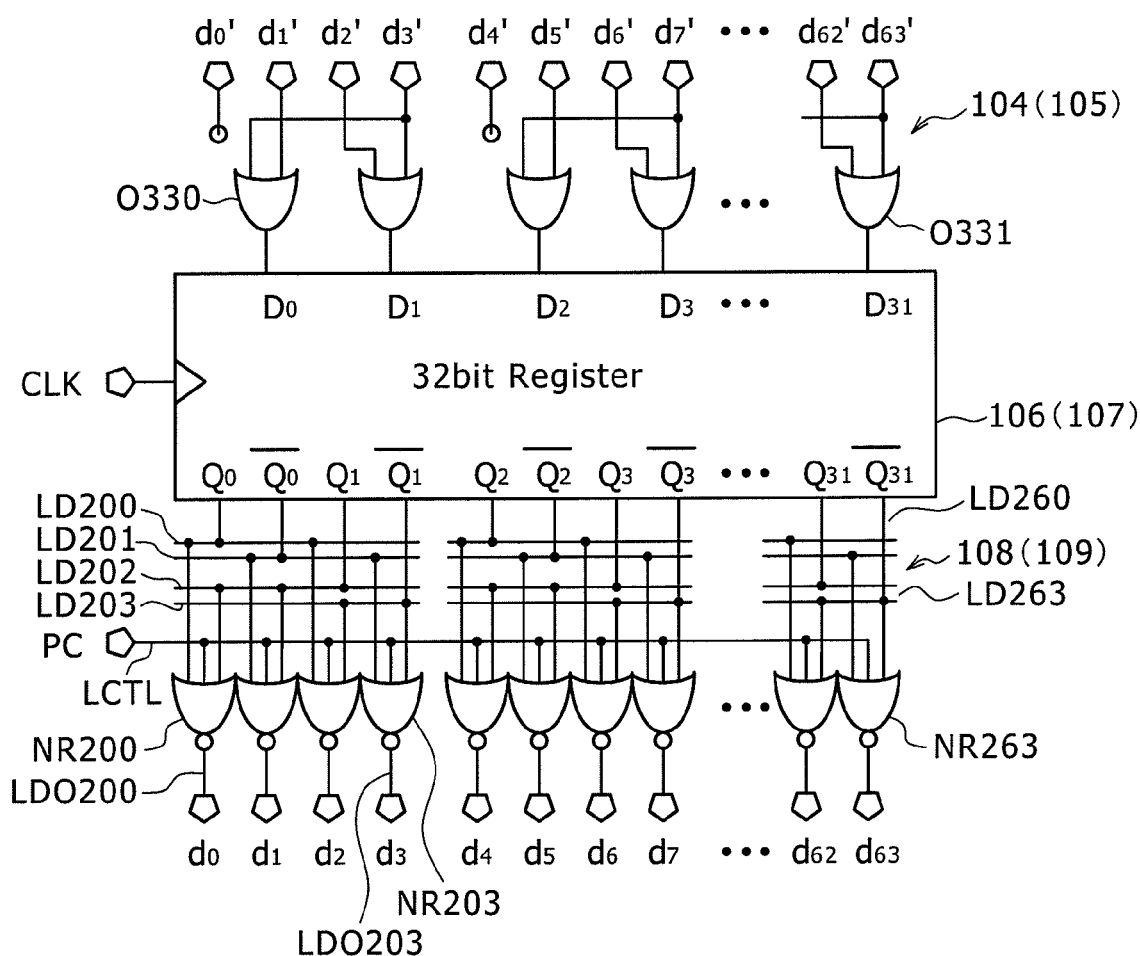
FIG. 7 is a circuit diagram illustrating exemplary configurations of an encode block and a decode and precharge control block in an input/output block of a register associated with the first embodiment of the invention.

Referring FIG. 7, there is shown an exemplary configuration of an encode block and a decode and precharge control block in the input/output block of a register associated with the first embodiment of the invention.

The configuration shown in FIG. 7 is equivalent to the configuration of the first encode block 104, the L register 106, and first decode and precharge control block 108 or the configuration of the second encode block 105, the R register 107, and the second decode and precharge control block 109 shown in FIG. 1.

In what follows, the configuration of the first encode block 104, the L register 106, and the first decode and precharge control block 108 is used for example.

Like the basic configuration shown in FIG. 4, 32 OR gates O300 through O331 are arranged in parallel in the first encode block 104.

A total of 64 bits of data d0' through d63' decoded by the first decode block 102 in units of two bits are supplied to the first encode block 104.

Then, these data are stored in the L register 106 as the 32-bit binary data encoded by the first encode block 104.

The L register 106 supplies bits Q0 through Q31 of the stored data and inverted bits /Q0 through /Q31 ("/" denotes inversion) thereof to the first decode and precharge control block 108.

In the configuration shown in FIG. 7, a configuration equivalent to the inverters IV200, IV201 of the decode block 200 shown in FIG. 7 is included in the register side.

In the first decode and precharge control block 108, the decode block 200 shown in FIG. 4 for every four bits including inverted bits is arranged.

The decode block 200 has 3-input NOR gates NR200 through NR263, decode lines LD200 through LD263, a control line LCTL, and decode output lines LDO200 through LDO263 as signal wiring.

The value stored in the L register 106 is decoded by the first decode and precharge control block 108, the decoded value is logically operated with a precharge control signal PC, and the resultant value is supplied to the EXOR operation block 113 of the subsequent stage as a decode value or a precharge value.

The following describes an EXOR operation block that is an operation circuit and F function used in the DES operation circuit.

Referring to FIG. 8, there is shown a truth table of an EXOR operation of 2-bit binary data.

Referring to FIG. 9, there is shown a truth table of an EXOR operation of 2-bit decode data.

Figure 10:
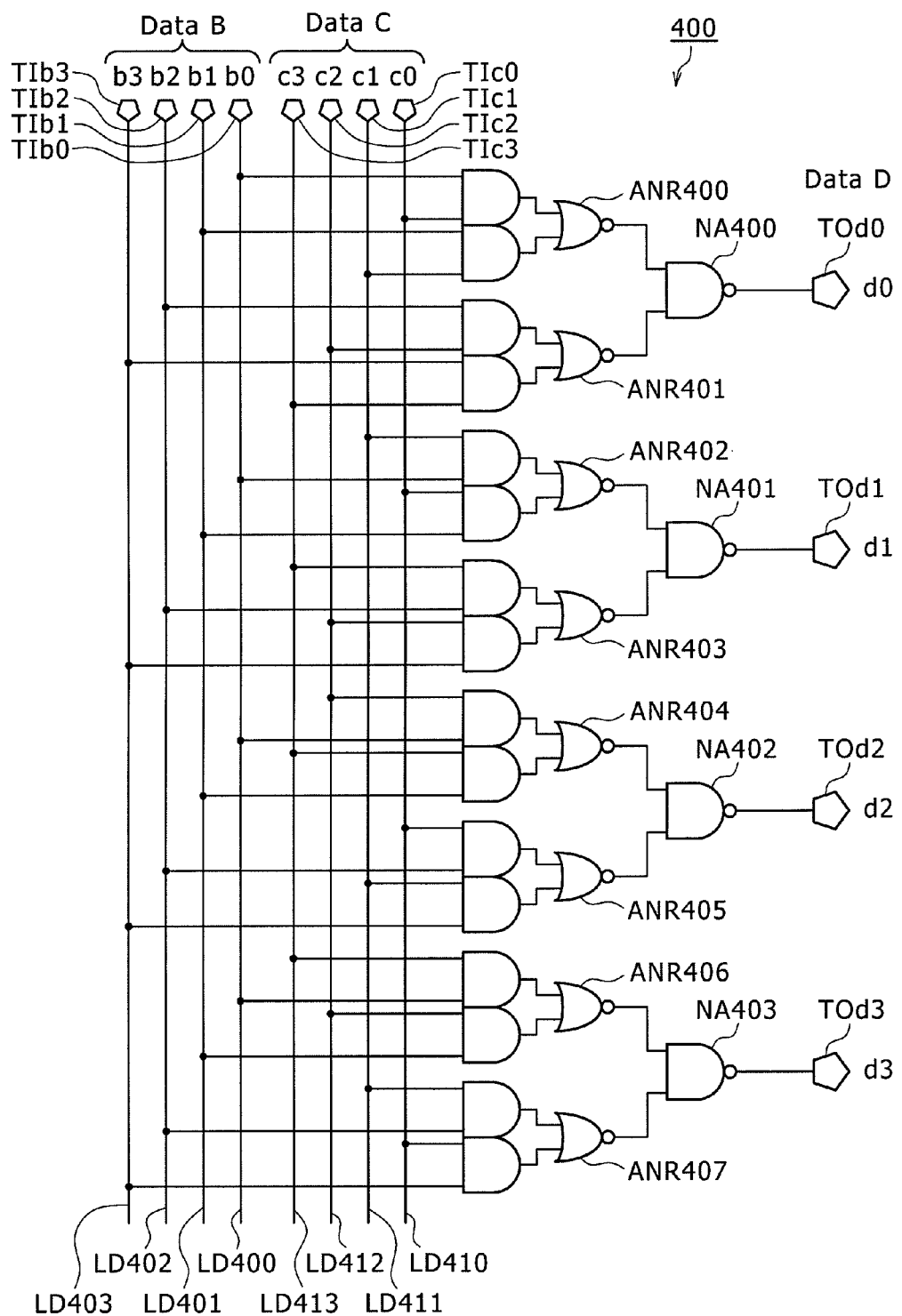
FIG. 10 is a circuit diagram illustrating an EXOR operation block formed on the basis of FIG. 9.

Referring to FIG. 10, there is shown a circuit diagram illustrating an EXOR operation block formed on the basis of FIG. 9.

Figure 11:
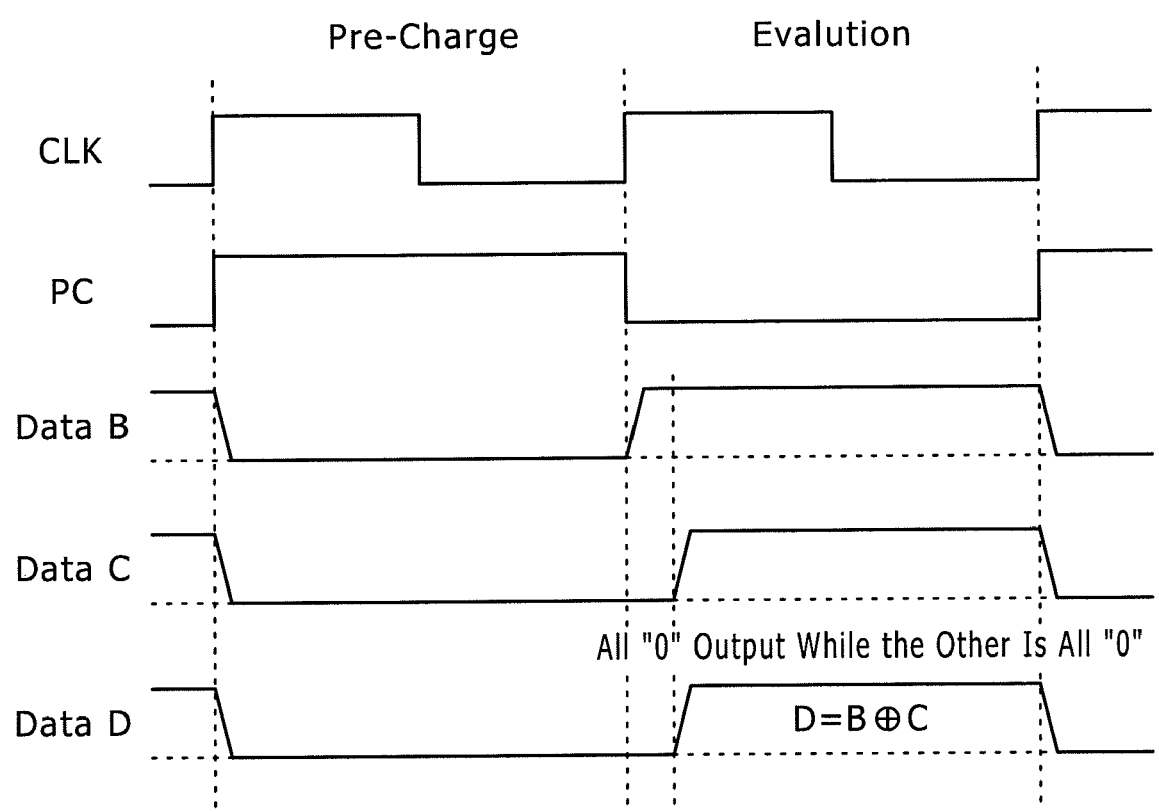
FIG. 11 is a timing chart of the circuit shown in FIG. 10.

Referring to FIG. 11, there is shown a timing chart of the circuit shown in FIG. 10.

In what follows, the EXOR operation block 113 will be described by use of reference numeral 400.

The EXOR operation block 400 has decode output lines LD400 through LD403, LD410 through LD413, AND-NOR gates ANR400 through ANR407, and 2-input NAND gates NA400 through NA403.

The EXOR operation block 400 also has input terminals TIb0 through TIb3, TIc0 through TIc3, and output terminals TOd0 through TOd3.

The decode output line LD400 is connected to the input terminal TIb0, the decode output line LD401 is connected to the input terminal TIb1, the decode output line LD402 is connected to the input terminal TIb2, and the decode output line LD403 is connected to the input terminal TIb3.

The decode output line LD410 is connected to the input terminal TIc0, the decode output line LD411 is connected to the input terminal TIc1, the decode output line LD412 is connected to the input terminal TIc2, and the decode output line LD413 is connected to the input terminal TIc3.

A first input terminal of the AND-NOR gate ANR400 is connected to the decode output line LD400 and a second input terminal is connected to the decode output line LD410. A third input terminal of the AND-NOR gate ANR400 is connected to the decode output line LD401 and a fourth input terminal is connected to the decode output line LD411.

A first input terminal of the AND-NOR gate ANR401 is connected to the decode output line LD402 and a second input terminal is connected to the decode output line LD412. A third input terminal of the AND-NOR gate ANR401 is connected to the decode output line LD403 and a fourth input terminal is connected to the decode output line LD413.

A first input terminal of the AND-NOR gate ANR402 is connected to the decode output line LD411 and a second input terminal is connected to the decode output line LD400. A third input terminal of the AND-NOR gate ANR402 is connected to the decode output line LD410 and a fourth input terminal is connected to the decode output line LD401.

A first input terminal of the AND-NOR gate ANR403 is connected to the decode output line LD413 and a second input terminal is connected to the decode output line LD402. A third input terminal of the AND-NOR gate ANR403 is connected to the decode output line LD412 and a fourth input terminal is connected to the decode output line LD403.

A first input terminal of the AND-NOR gate ANR404 is connected to the decode output line LD412 and a second input terminal is connected to the decode output line LD400. A third input terminal of the AND-NOR gate ANR404 is connected to the decode output line LD413 and a fourth input terminal is connected to the decode output line LD401.

A first input terminal of the AND-NOR gate ANR405 is connected to the decode output line LD410 and a second input terminal is connected to the decode output line LD402. A third input terminal of the AND-NOR gate ANR405 is connected to the decode output line LD411 and a fourth input terminal is connected to the decode output line LD403.

A first input terminal of the AND-NOR gate ANR406 is connected to the decode output line LD413 and a second input terminal is connected to the decode output line LD400. A third input terminal of the AND-NOR gate ANR406 is connected to the decode output line LD412 and a fourth input terminal is connected to the decode output line LD401.

A first input terminal of the AND-NOR gate ANR407 is connected to the decode output line LD411 and a second input terminal is connected to the decode output line LD402. A third input terminal of the AND-NOR gate ANR407 is connected to the decode output line LD410 and a fourth input terminal is connected to the decode output line LD403.

A first input terminal of the NAND gate NA400 is connected to the output terminal of the NOR gate NR400 and a second input terminal is connected to the output terminal of the NOR gate NR401.

A first input terminal of the NAND gate NA401 is connected to the output terminal of the NOR gate NR402 and a second input terminal is connected to the output terminal of the NOR gate NR403.

A first input terminal of the NAND gate NA402 is connected to the output terminal of the NOR gate NR404 and a second input terminal is connected to the output terminal of the NOR gate NR405.

A first input terminal of the NAND gate NA403 is connected to the output terminal of the NOR gate NR406 and a second input terminal is connected to the output terminal of the NOR gate NR407.

In an EXOR operation between operations based on binary data, if control is made to change both the two pieces of data to the original data after setting the precharge data all to "0" and if there is a delay difference in the two signal changes, the following will result.

Namely, the output of the EXOR operation circuit changes from "0" to the original EXOR operation result after changing to the data that changed quickly, making it possible for this unintended transition to become a target of DPA attack as a leak.

However, with the EXOR operation block 400 shown in FIG. 10 in which an EXOR operation is executed directly between decode data, the input is received at the AND-NOR gates NAR400 through ANR407.

Therefore, as shown in FIG. 11, while the precharge data are all "0" in the later data of the two pieces of decode data, all "0" in the precharge state is kept outputted regardless of the value of the data that changed earlier.

Then, when the later data has changed, transition is made from all "0" to the EXOR result, thereby preventing the "unintended data" that becomes a target of DPA attack from being generated.

In the present embodiment, the decode data from the R register 107 is encoded by the third encode block 110 immediately before the F function block 111 and the resultant binary data is entered in the F function block 111.

In the F function block 111, as described above with reference to FIG. 2, the 32-bit binary data is extended into 48 bits to be exclusive-ORed with the 48-bit round key and a result of this operation is normally entered in the Sbox.

Figure 12:
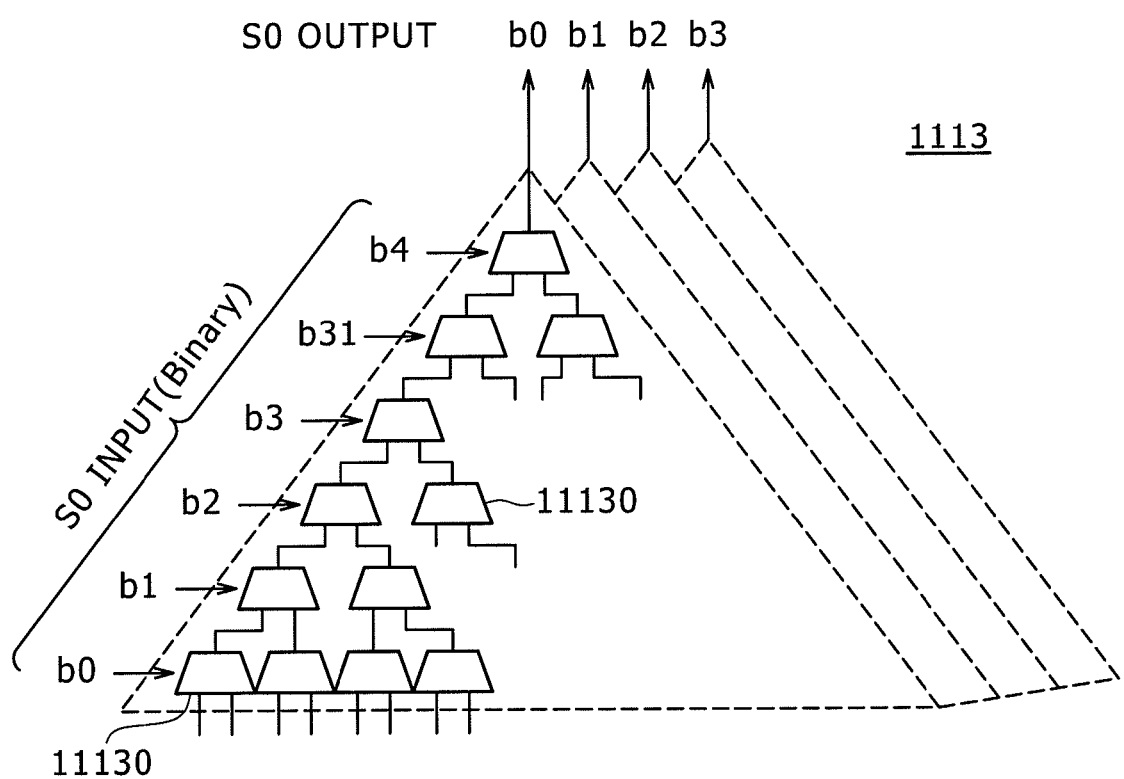
FIG. 12 is a diagram illustrating an exemplary configuration of an Sbox.

Referring to FIG. 12, there is shown an exemplary configuration of the Sbox.

Figure 13:
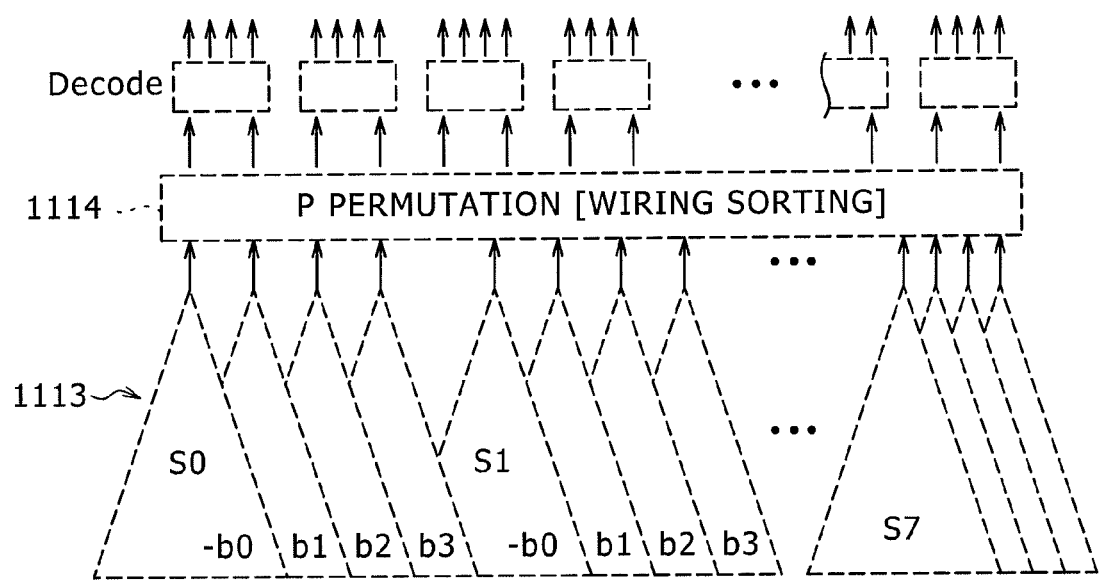
FIG. 13 is a diagram illustrating an exemplary decode output of an Sbox.

Referring to FIG. 13, there is shown an exemplary decode output of the Sbox.

Figure 14:
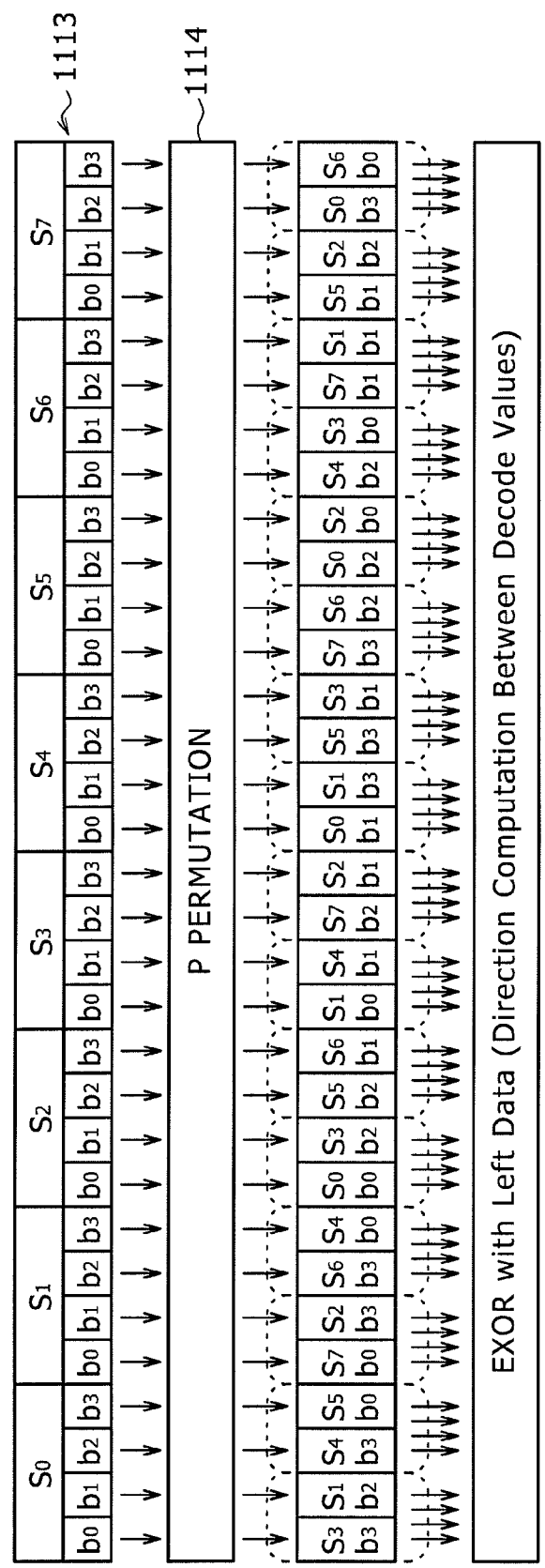
FIG. 14 is a diagram illustrating a more specific example of the decode output of an Sbox.

Referring to FIG. 14, there is shown a more specific example of the decode output of the Sbox.

Figure 15:
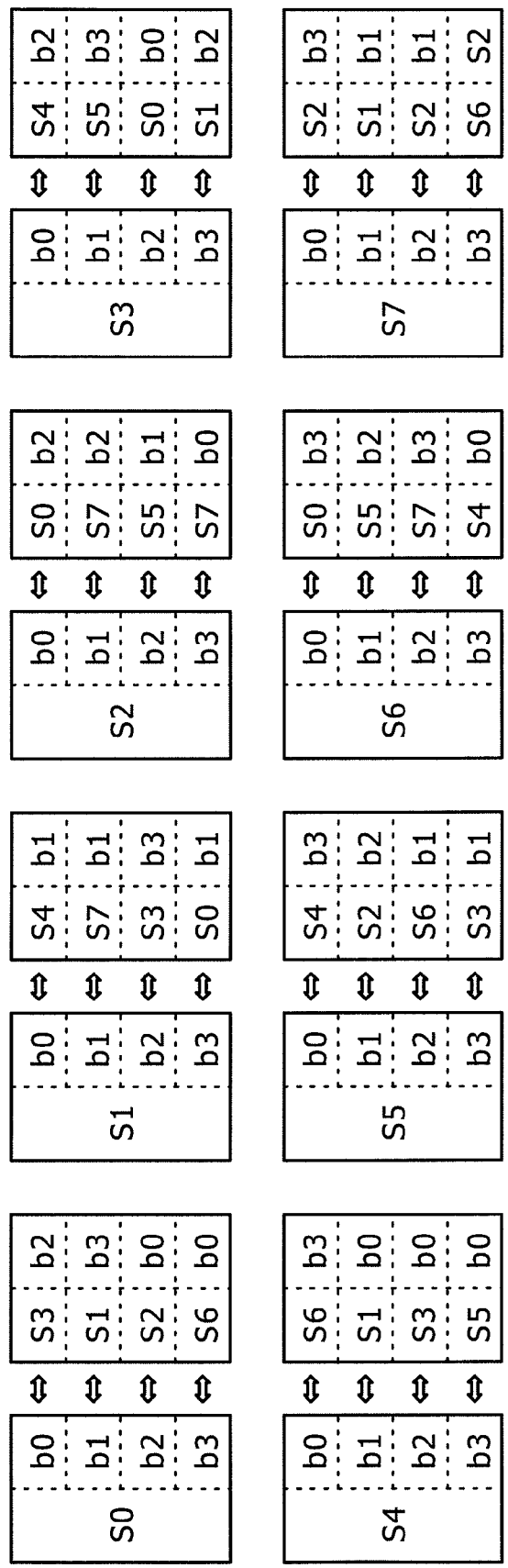
FIG. 15 is a diagram illustrating decode pairs of output bits of all Sboxes.

Referring to FIG. 15, there is shown decode pairs of the output bits of all Sboxes.

FIG. 12 shows a sub Sbox S0.

A configuration shown in FIG. 12 is called BDD (Binary Decision Diagram), in which switch circuits 11130 are arranged in a pyramid manner.

The input of each of these switch circuits is connected on the basis of a table defined by specifications, four of these pyramids constituting a sub Sbox S0.

Next, as shown in FIG. 13, a Sbox 1113 is constituted by arranging eight sub Sboxes S0 through S7 in parallel and the output bits thereof are rearranged on the basis of rearrangement information by P permutation by the P permutation section 1114.

The output of the Sbox 1113 is binary data and, as shown in FIG. 14, the binary output of the Sbox 1113 is rearranged on the basis of P permutation by the P permutation section 1114 and then decoded with each adjacent bit, providing the output to the F function block 111.

The pairs of decode of the bits of the sub Sbox S0 are bit b2 of sub Sbox S3 for bit b0, bit b3 of Sbox S1 for bit b1, bit 0 of sub Sbox S2 for bit b2, and bit b0 of sub Sbox S6 for bit b3.

Thus, the pairs of decode of the bits of sub Sbox S0 are always the bits of different sub Sboxes.

Then, this decoded output of F function is exclusive-ORed with the decoded data of the L register 106 in the state of a decoded value and the result of the EXOR operation is supplied to the R register 107. The supplied data is captured at the rise of a latch pulse, updating the value of the R register 107.

Next, when transition is made from precharge phase to evaluation phase, one signal line goes high each time decode is made, this signal change providing a target of DPA attack.

In an attack method, a cryptographic operation is first executed by use of two or more plaintexts to measure an electric current consumption waveform.

Next, a simulation is executed with each of the plaintexts by estimating a 6-bit key of sub Sbox S0 for example. On the basis of the value or the value change of a node in attention, actual electric current consumption waveforms are grouped.

Lastly, a difference between the averages of the groups is taken to check for a peak, thereby determining the validity of the estimated key.

However, the Sbox outputs are decoded, so that always only one output changes on a decode basis regardless of the data, causing no difference between the groups.

To be strict, it is difficult to make equal the wiring capacities of the decoded signals; this capacity difference causes a minute difference between the charge/discharge current due to the decode value, which may provide a target of the attack.

However, as compared with the case in which grouping is made depending on whether the bit in attention flows or does not flow charge/discharge current and a difference between the averages of the groups is taken, as with a normal DPA attack, the leak current is significantly smaller, thereby extremely making difficult the DPA attack.

The DPA attack is divided into a 1-bit attack in which attack is made by paying attention to one bit of sub Sbox and a 4-bit attack in which attack is made by paying attention to all four bits.

The 4-bit attack is higher in correlation than the 2-bit attack, so that the peak current when the estimated key is correct is greater.

However, in the case where a 1-bit attack is executed against bit b0 of sub Sbox S0, for example, bit b0 of sub Sbox S0 is decoded with bit b2 of sub Sbox S3, so that a DAP attack must be executed by estimating both sub Sboxes S0 and S3.

Because the key of sub Sbox is six bits long, if $2^6=64$ combinations are estimated in a normal DPA attack, only one peak waveform appears therein.

On the other hand, with the present embodiment, key of 12 bits must be estimated, thereby requiring the estimation of a 12-bit key in which the peak appears from $2^{12}=4,096$ combinations.

In addition, a leak source is an electric current based on the difference between the load capacities of the decode wiring, so that the original leak current is extremely small, thereby making any DAP attacks extremely difficult.

If an attack is made against the four bits of sub Sbox S0, these four bits are decoded with the bits of sub Sboxes S3, S1, S2, and S6, so that the keys of these four sub Sboxes must be estimated at the same time. And, a 30-bit key with the peak appearing must be estimated from $2^{(6+6*4)}=2^{30}=1,073,741,824$ combinations, which actually makes any attacks extremely difficult.

FIG. 15 shows the decode pairs of the output bits of all sub Sboxes. In each case, an attack must be tried by estimating the keys of 4 to 5 sub Sboxes, making the attack very difficult.

The description made so far is about the case in which decode is executed on a two bit basis. However, the present embodiment is also applicable when decode is executed on a three bit basis, a four basis, or on basis of more bits.

Thus, the leak current accompanying the charge/discharge of a signal propagated along the signal wiring may be made the charge/discharge current that disables any DPA attacks, thereby realizing a configuration in which the DPA attack are difficult.

The following describes an overall operation of the configuration shown in FIG. 1.

DES cryptography is formed by an operation of 16 rounds. As described before, if this configuration is designed by hardware, a circuit for one round is arranged and operated 16 times as shown in FIG. 1.

In executing a cryptographic operation, a plaintext is IP-permutated by the initial permutation block 101, decoded by the first decode block 102 on a two bits basis, and supplied to the L register 106, the R register 107 via the switches 103L, 103R.

In the present embodiment, the input data into the L register 106 and the R register 107 is encoded by the first encode block 104 and the second encode block 105 to be stored in the L register 106 and the R register 107 as binary data.

Then, the register stored values are decoded by the first decode and precharge control block 108 and the second decode and precharge control block 109 to be logically operated with a precharge control signal PC to be supplied to the operation circuit as a decode value or a precharge value. The data on the side of the L register 106 is supplied to the EXOR operation block 113.

The data on the side of the R register 107 is supplied to the input of the L register 106 and the input of the F function block 111 as decode data to be encoded by the third encode block 110 before the input stage of the F function block 111 into binary data that is entered in the F function block 111. An F function operation is executed on this binary data.

Next, the output of the F function block 111 is decoded by the second decode block 112 to be entered in the EXOR operation block 113.

The data in the L register 106 is decoded to be entered in the other input of the EXOR operation block 113. An EXOR operation is executed on this entered data as decode data, the result of the operation being supplied to the input of the R register 107.

The output of the F function block 111 is exclusive-ORed with the value in the L register 106. At this moment, both the inputs are decode values.

These decode values may be encoded, exclusive-ORed, and then decoded again or an EXOR operation may be directly executed on the decode data.

If an EXOR operation is directly executed on decode data, no leak that provides a target of a DPA attack based on signal delay difference will not occur.

In the present embodiment, as described above, the method of directly executing an EXOR operation on decode values is employed. A result of the EXOR operation between the output of the F function block 111 and the stored value of the L register 106 is encoded by the fourth encode block 114 with the output of the R register 107 in the case of round 16, the resultant encoded value being inverse-IP-permutated to be outputted as a ciphertext.

In the case before round 16, a result of the EXOR operation between the output of the F function block 111 and the stored value of the L register 106 is supplied to the input side of the R register 107.

As described above, according to this first embodiment of the invention, decode values are used for the data to be propagated along signal wiring to provide a configuration in which operations are executed by the decode values in the operation block. This novel configuration reduces the leak currents along the signal wiring and in the operation block, thereby enhancing DPA resistance.

(2) The Second Embodiment

The following describes the second embodiment of the invention.

Figure 16:
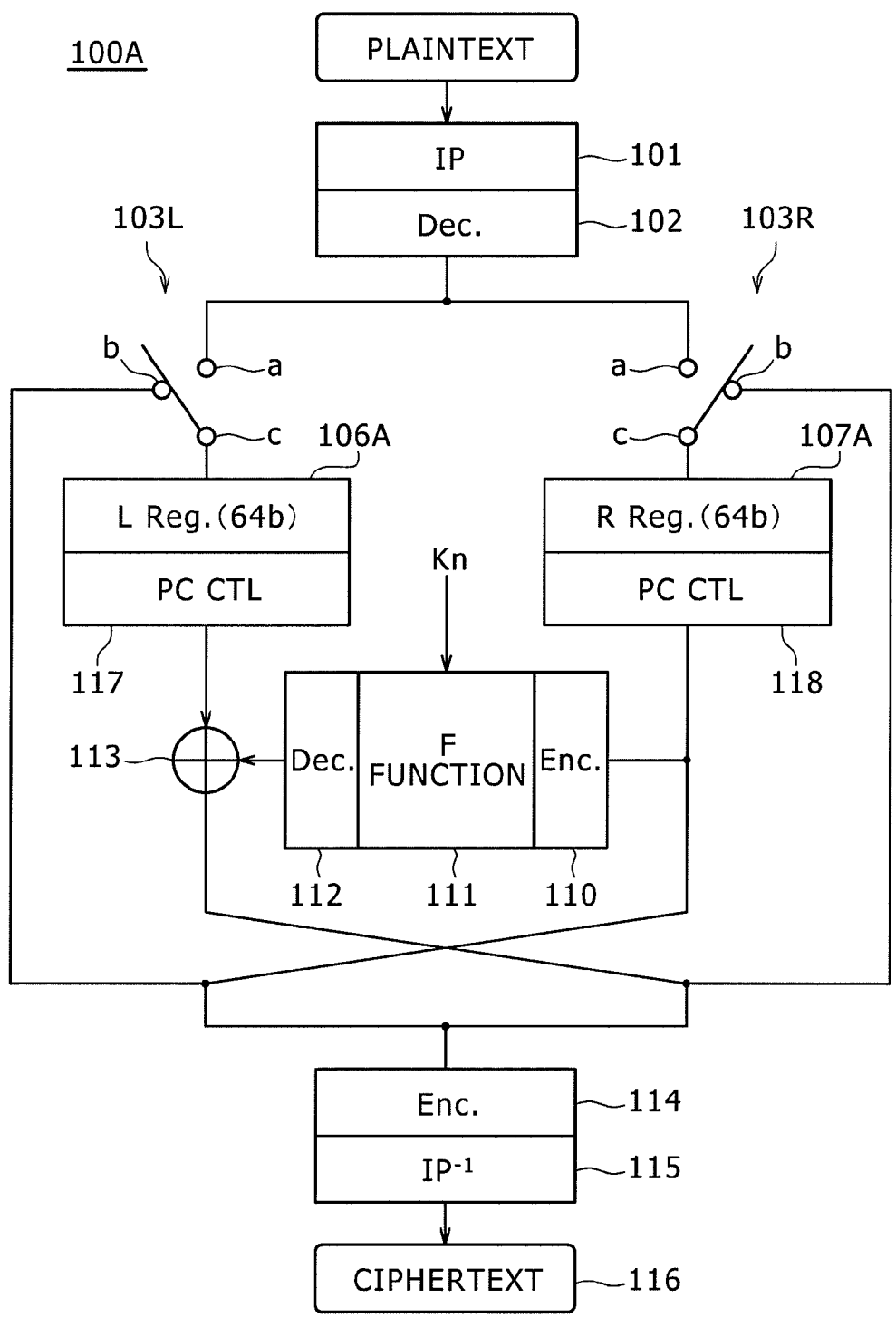
FIG. 16 is a diagram illustrating an exemplary configuration of a DES operation circuit as a cryptographic processing apparatus practiced as a second embodiment of the invention.

Referring to FIG. 16, there is shown an exemplary configuration of a DES operation circuit as a cryptographic processing apparatus practiced as the second embodiment of the invention.

A DES operation circuit 100A associated with the second embodiment differs from the DES operation circuit 100 associated with the first embodiment in the following points.

Namely, in the DES operation circuit 100A, decode data of a first decode block 102 is stored in an L register 106A and an R register 107A in 64 bits without being encoded.

Inverted outputs of the stored values of the L register 106A and the R register 107A are logically operated with a precharge control signal PC in a first precharge control block 117 and a second precharge control block 119 to be supplied to an operation block as a decode value or a precharge value.

Figure 17:
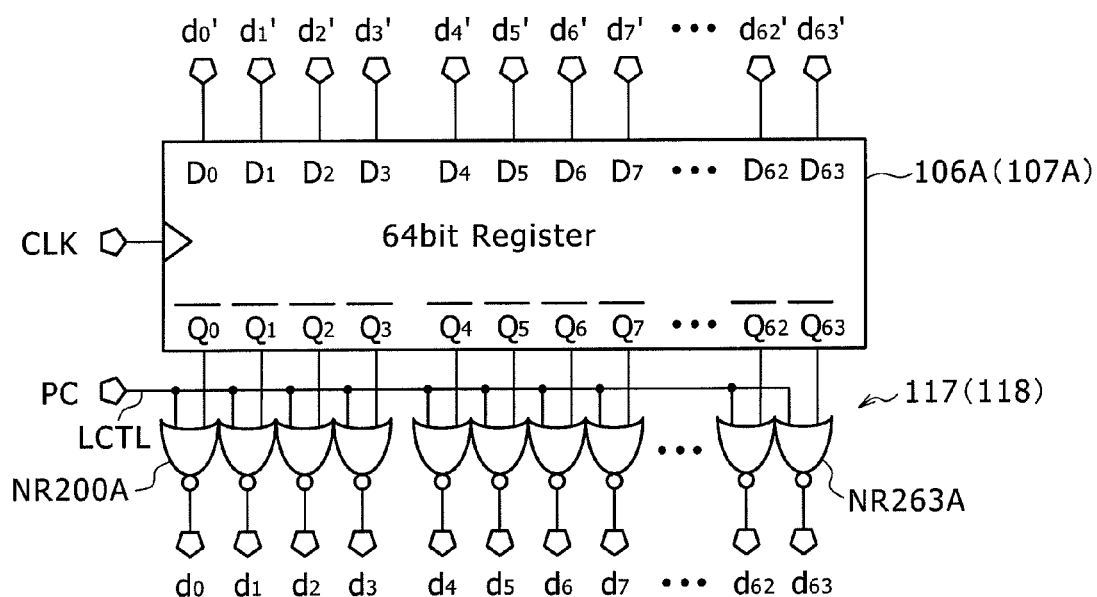
FIG. 17 is a diagram illustrating an exemplary configuration of a precharge control block in an input/output block of a register associated with the second embodiment.

Referring to FIG. 17, there is shown an exemplary configuration of a precharge control block in an input/output block of a register associated with the second embodiment.

As shown in FIG. 17, an encode block of a first precharge control block 117 (a second precharge control block 118) is not arranged on the input side of an L register 106A (an R register 107A), decode data d0' through d63' of a first decode block 102 being entered in the input side without change.

No decode function block such as decode line and so on are not arranged on the output side of the L register 106A (the R register 107A), only a control line LCTL and NOR gates NR200A through NR263A being arranged on the output side.

According to the above-mentioned second embodiment, other configurations are the same as in the first embodiment, substantially the same effects as those of the above-mentioned first embodiment are provided.

(3) The Third Embodiment

With the first and second embodiments of the invention, examples were described in which these embodiments are applied to DES.

With the third embodiment, an example in which the concept of the present invention is applied to AES (Advanced Encryption Standard).

Figure 18:
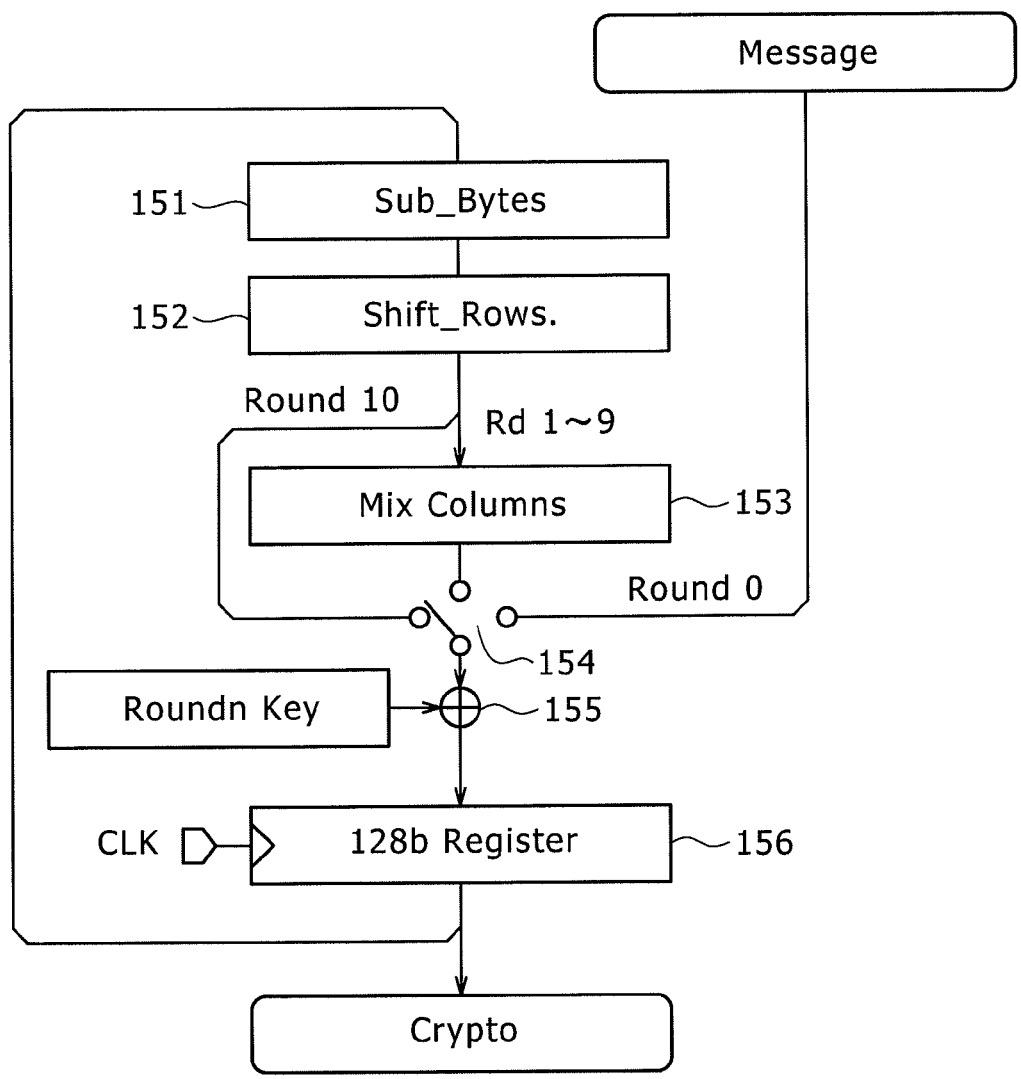
FIG. 18 is a diagram illustrating an exemplary configuration of a general-purpose AES operation circuit.

Referring to FIG. 18, there is shown an exemplary configuration of a general AES operation circuit.

Figure 19:
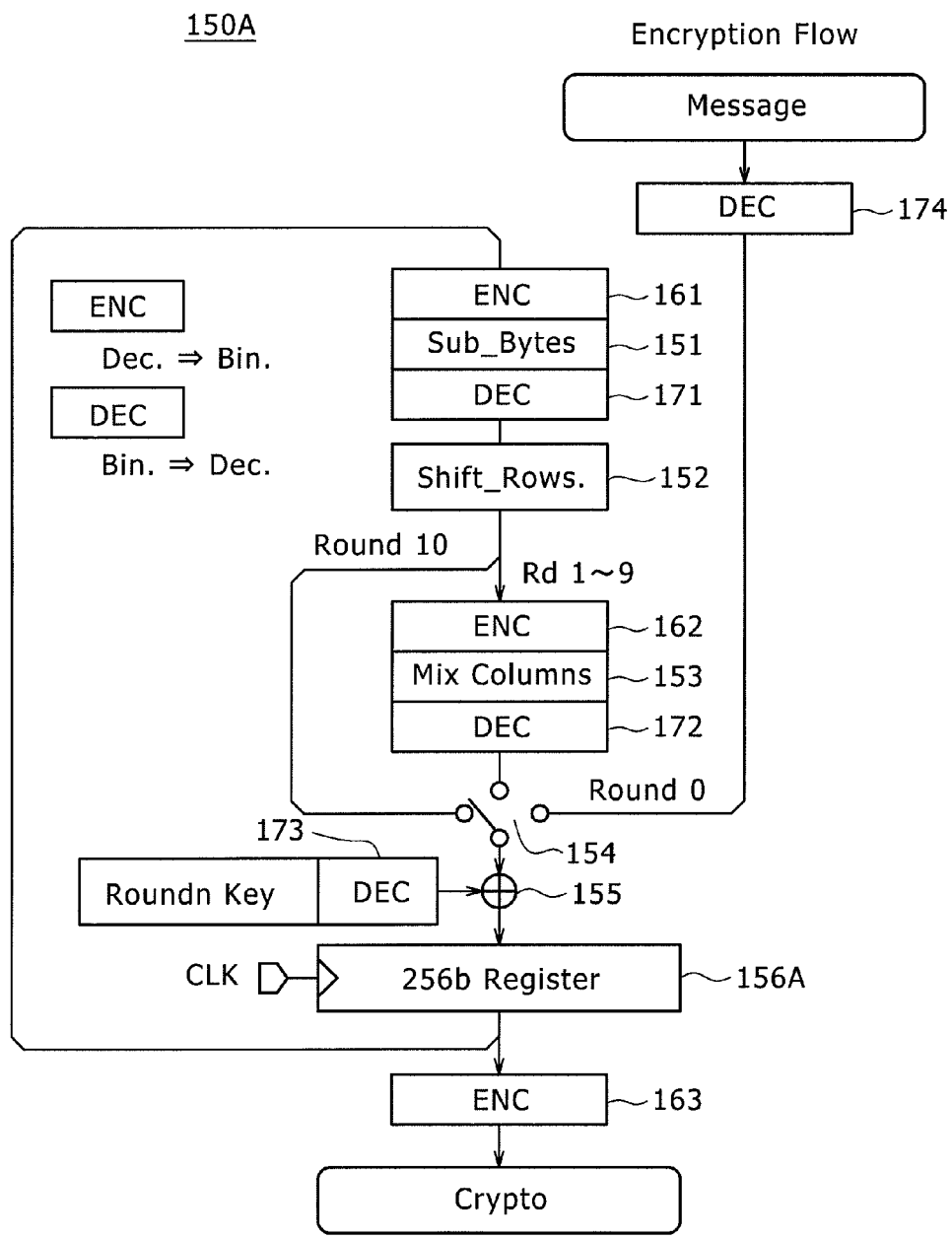
FIG. 19 is a diagram illustrating an exemplary configuration of an AES operation circuit practiced as a third embodiment of the invention.

Referring to FIG. 19, there is shown an exemplary configuration of an AES operation circuit practiced as the third embodiment.

With AES, data is 128 bits long and three keys, 128 bits, 192 bits, and 256 bits, are defined. These keys are registered with FIPS (Federal Information Processing Standard) as the specifications of AES-128, AES-192, and AES-256. The number of operation rounds are 10, 12, and 14 according to the key lengths.

In what follows, AES-128 will be described.

An AES operation circuit 150 shown in FIG. 18 has a sub bytes conversion block 151, a shift rows conversion block 152, a mix columns conversion block 153, a switch 154, an EXOR operation block 155, and a 128-bit register 156.

The sub bytes conversion block 151 executes Sub_Bytes( ) function to execute substitution conversion by Sbox.

The shift rows conversion block 152 executes Shift_Row( ) function to shift byte data by the sub bytes conversion block 151.

The mix columns conversion block 153 executes Mix_Column( ) function to execute a matrix operation in $GF(2^8)$.

In this example, the register 156 is arranged immediately before the sub bytes conversion block (Sub_Byte( ) function) 151; it is also practicable to arrange this register at another position.

At the time of cryptographic operation, a plaintext is exclusive-ORed with the key of round 0 and then captured in the 128-bit register 156.

Next, when the output of the 128-bit register 156 changes, Sub_Bytes( ) function and Shift_Row( ) function are executed. Up to round 9, Mix_Column( ) function is continuously executed and an operation result thereof is exclusive-ORed with the round key.

In round 10, Mix_Column( ) function is skipped and an operation result obtained after Shift_Rows( ) function is exclusive-ORed with the found key to be captured into the 128-bit register 156.

Thus, the basic processing of the AES operation circuit 150 is executed.

With an AES operation circuit 150A associated with the present embodiment, an encode block 161 is arranged on the input side of the sub bytes conversion block 151 and a decode block 171 is arranged on the output side of the sub bytes conversion block 151.

An encode block 162 is arranged on the input side of the mix columns conversion block 153 and a decode block 172 is arranged on the output side of the mix columns conversion block 153.

A decode block 173 is arranged on the input block of the round key.

A decode block 174 is arranged on a plaintext supply block.

Then, an encode block 163 is arranged in a ciphertext output block of a register 156A.

In the AES operation circuit 150A associated with the present embodiment, a plaintext is decoded by a decode block 174 to be entered in an operation flow.

A result of the operation is encoded by an encode block 163 to be outputted.

In the operation flow, encoding is executed by the input of Sub_Bytes( ) function and Mix_Column( ) function and the operation is executed in binary, a result of the operation being decoded by the decode blocks 171, 172 to be outputted.

The round key is also decoded by the decode block 173 to be supplied to an operation flow where the decoded values are exclusive-ORed with each other.

In this example, the decode value is stored in the register 156A without change; in the case of decoding on a two bits basis, a register of 256 bits, double the 128-bit register, is arranged.

It should be noted that another configuration may also be practicable in which the register value is encoded at the input to be stored in binary and the output thereof is decoded to be supplied to the operation block.

According to the above-mentioned third embodiment of the invention, substantially the same effects as those of the above-mentioned first and second embodiments are provided.

(4) The Fourth Embodiment

The following describes the fourth embodiment of the invention.

Figure 20:
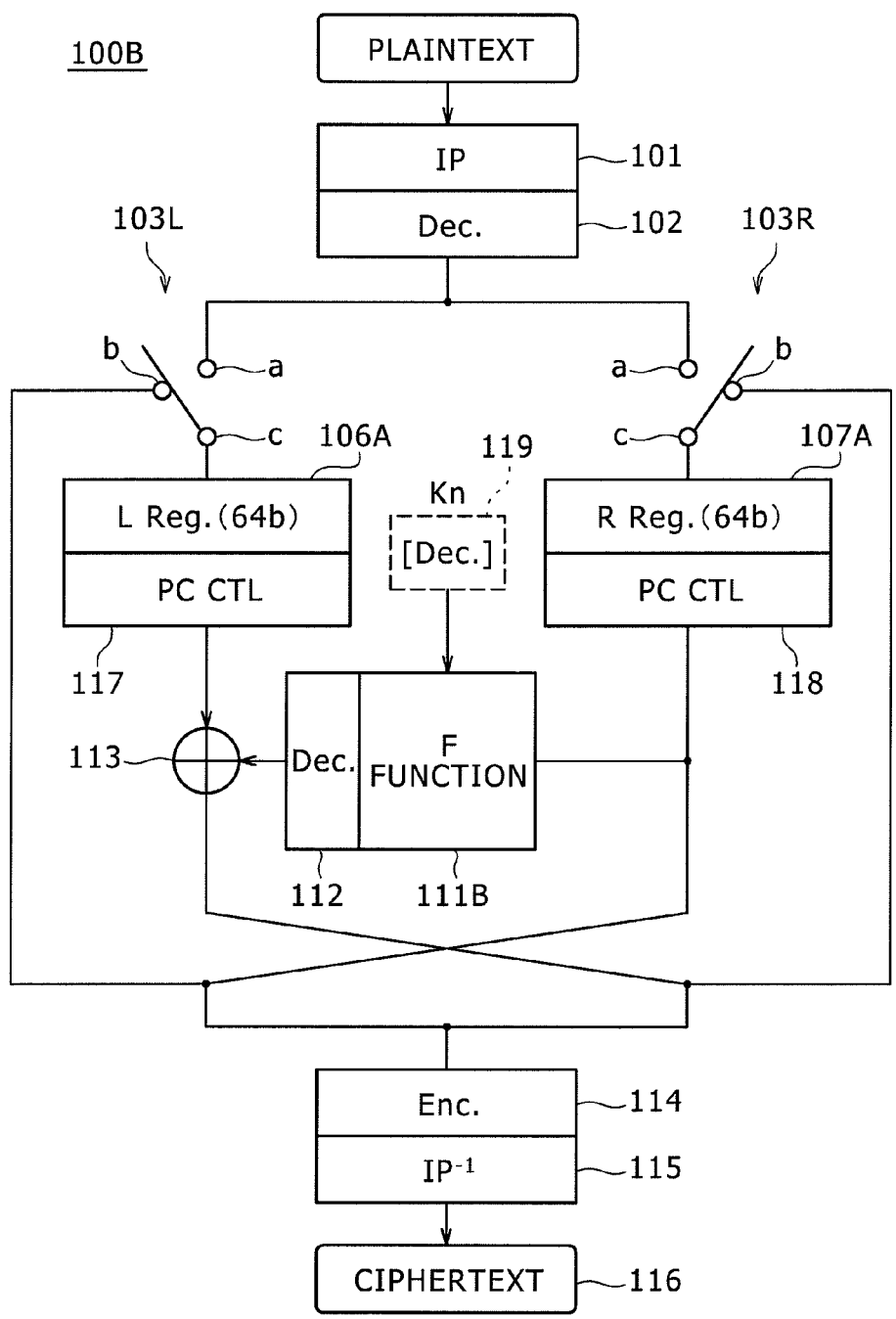
FIG. 20 is a diagram illustrating an exemplary configuration of a DES operation circuit 110B as a cryptographic processing apparatus practiced as a fourth embodiment of the invention.

Referring to FIG. 20, there is shown an exemplary configuration of a DES operation circuit as a cryptographic processing apparatus practiced as the fourth embodiment of the invention.

A DES operation circuit 100B associated with the fourth embodiment differs from the DES operation circuit 100A associated with the second embodiment in the following.

As described above, the DES operation circuit 100A associated with the second embodiment uses a signal propagating along signal wiring as a decode value, thereby making DPA attacks difficult.

In the operation block, encoding is executed at the input thereof to be operated in binary, leaving the possibility that a leak current at this point becomes a target of attack.

The DES operation circuit 100B associated with the fourth embodiment has a configuration in which the operation block also operates with decode values, thereby reducing the possibility of the leak current in the operation block.

Figure 21:
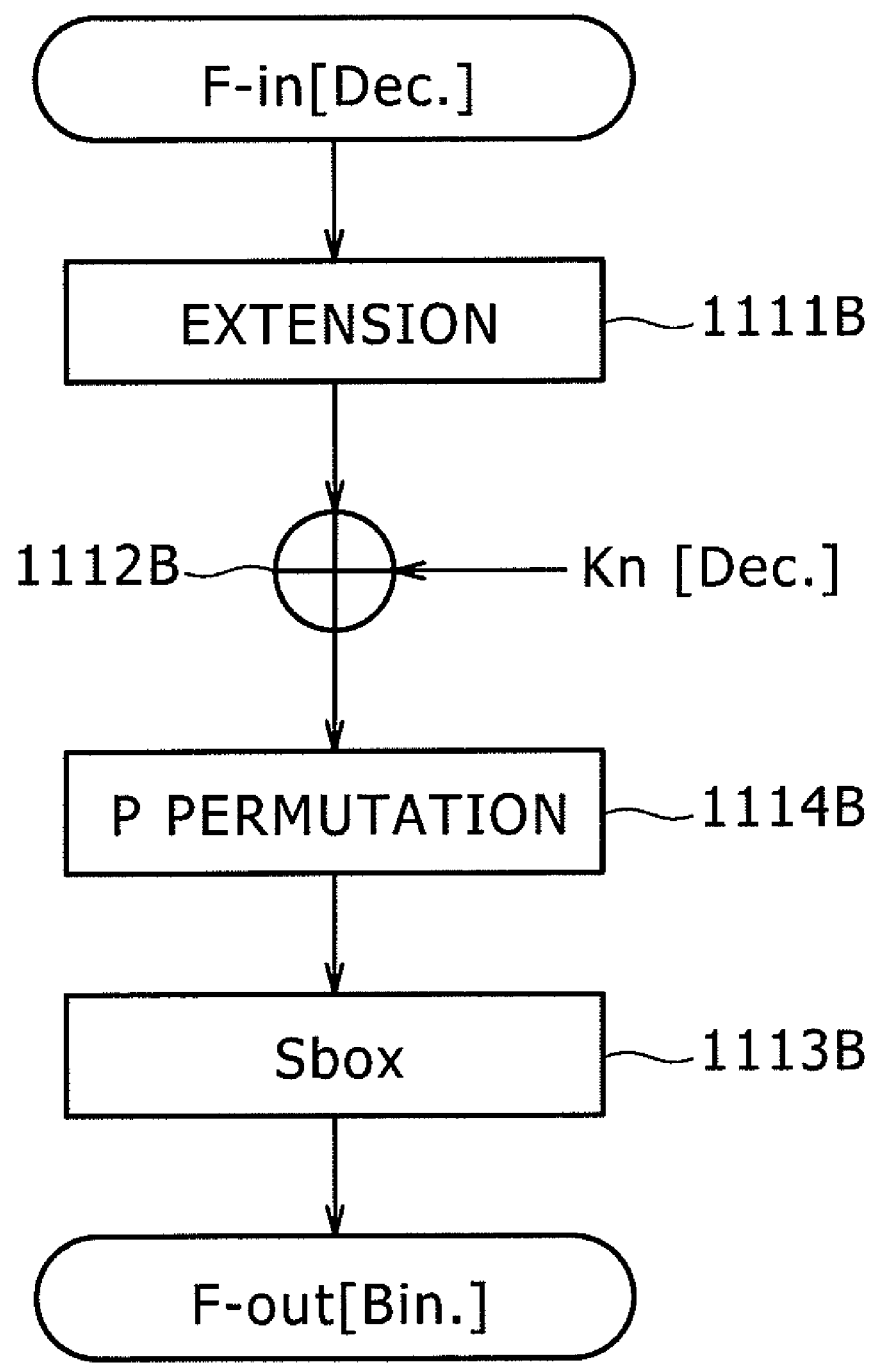
FIG. 21 is a diagram illustrating an F function block of the DES operation circuit 100B associated with the fourth embodiment.

Referring to FIG. 21, there is shown an F function block of the DES operation circuit 100B associated with the fourth embodiment.

The F function block 111B shown in FIG. 21 basically differs from the F function block 111 shown in FIG. 2 in that round key Kn is decoded and nonlinear permutation is executed by Sbox after executing P permutation.

Then, in the DES operation circuit 100B associated with the fourth embodiment, a decode block 119 is arranged at the input block to the F function block 111B of round key Kn and the encode block of the data input block of the R register 107A of the F function block 111B is omitted.

Decode data is entered in the F function block 111B, bit extension is executed on the entered decode data in the extension section 1111B, and the extended data is exclusive-ORed with the round key of the decode data as a decode value.

Next, originally, nonlinear conversion is executed by Sbox and then P permutation is executed for output; however, in the fourth embodiment, P permutation is executed by the P permutation section 1114B and then nonlinear conversion is executed by Sbox 1113E to output F function.

The following specifically explains a configuration for executing an operation with a 2-bit decode value.

Figure 22:
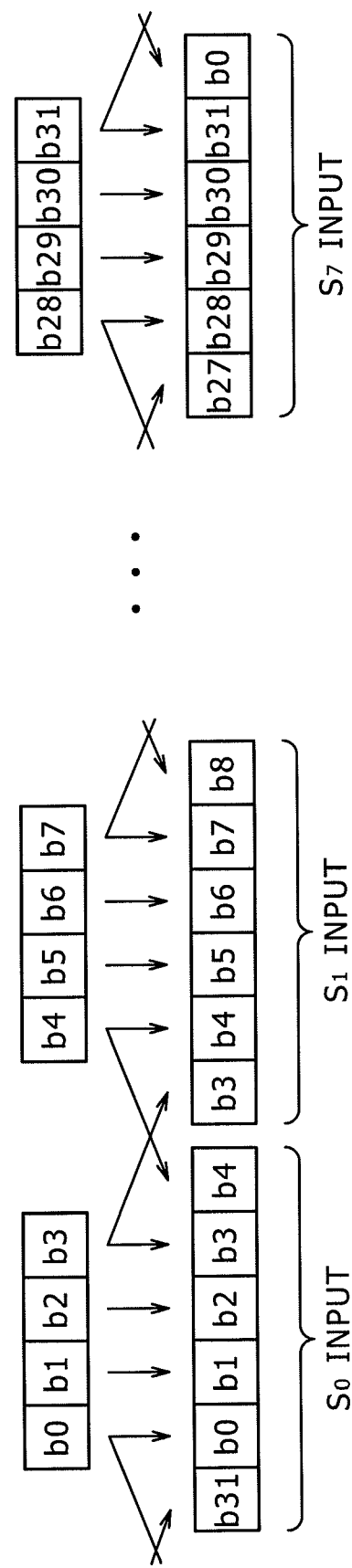
FIG. 22 is a diagram illustrating an exemplary extended function in an ordinary binary operation.

Referring to FIG. 22, there is shown one example of an extended function in a normal binary operation.

Figure 23:
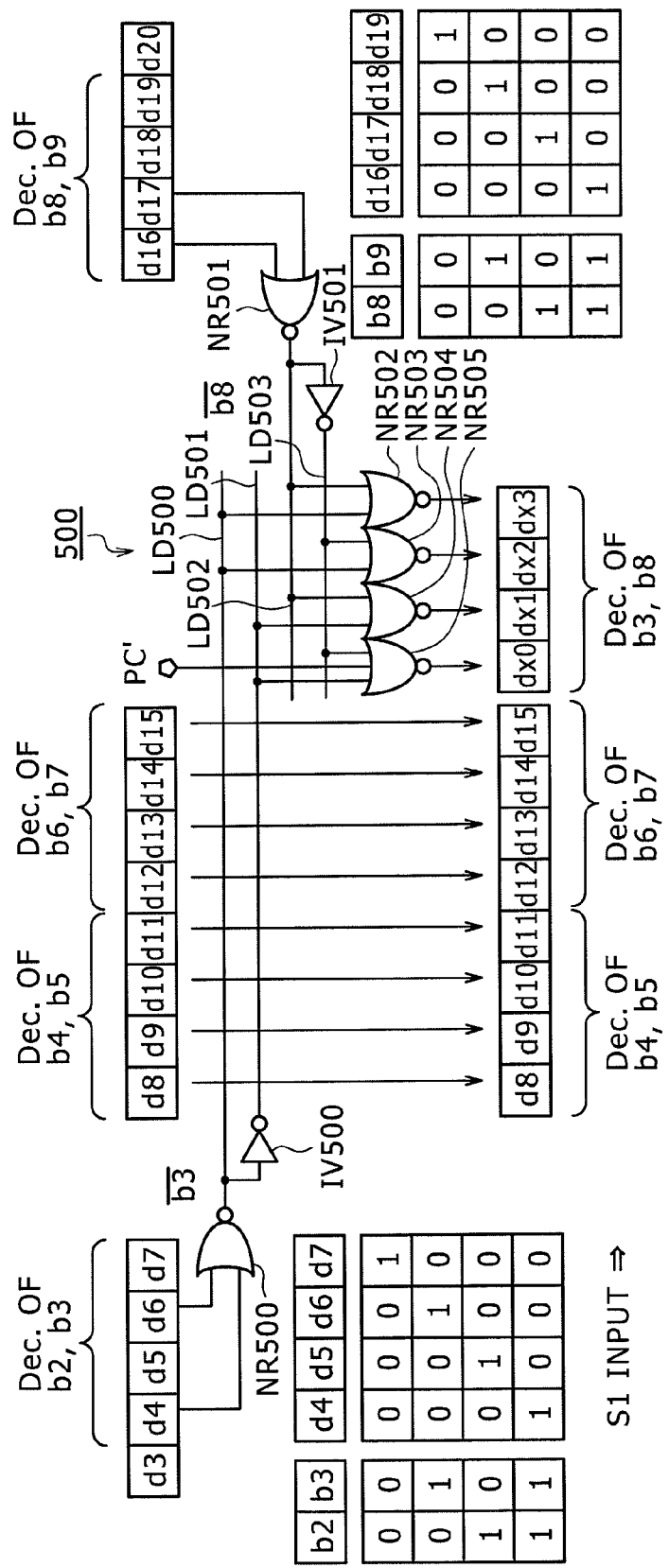
FIG. 23 is a diagram illustrating an extended function in the fourth embodiment.

Referring to FIG. 23, there is shown a diagram illustrating an extended function in the fourth embodiment.

Figure 24:
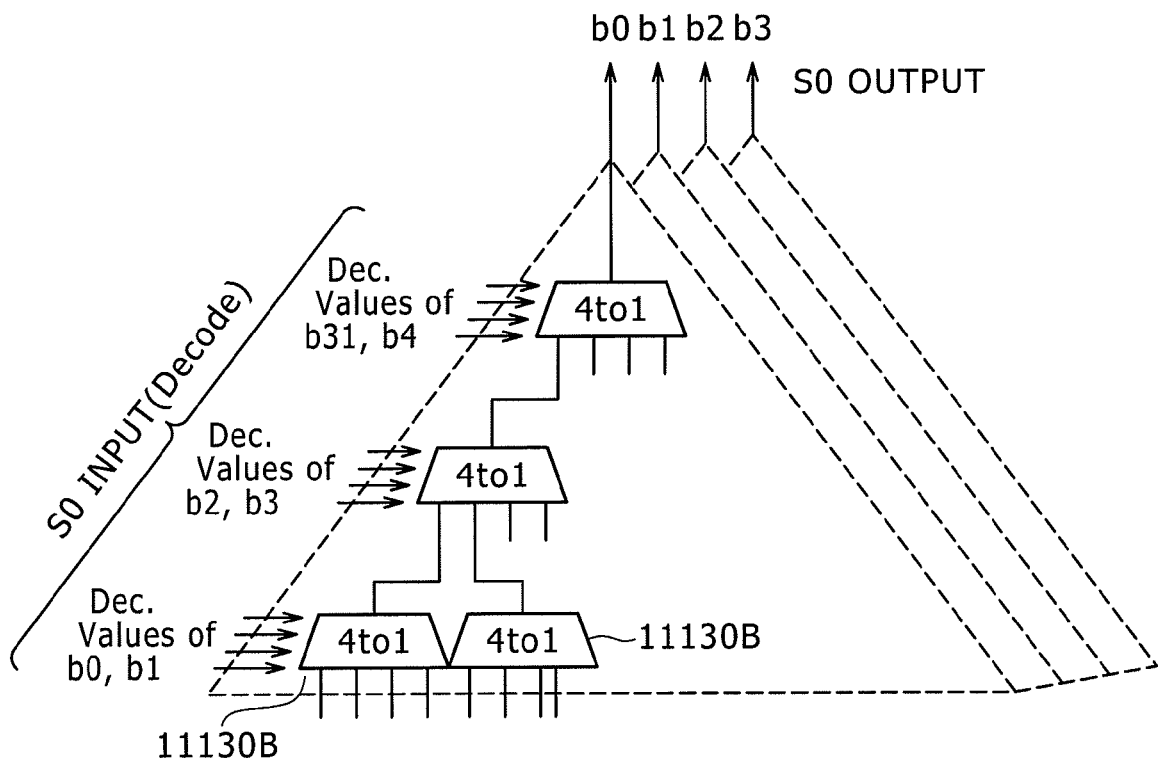
FIG. 24 is a diagram illustrating an exemplary configuration of a sub Sbox of the Sbox of BDD in the fourth embodiment.

Referring to FIG. 24, there is shown an exemplary configuration of sub Sbox of Sbox of BDD in the fourth embodiment.

Figure 25:
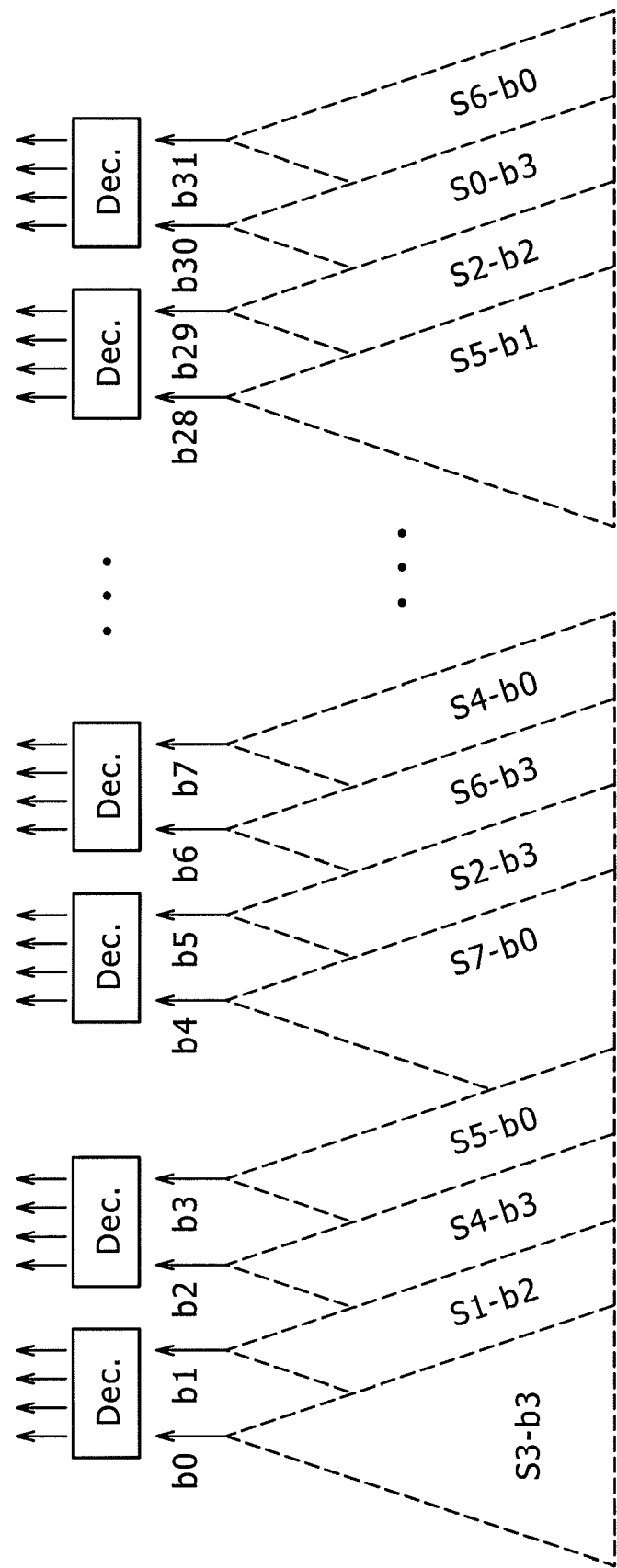
FIG. 25 is a diagram illustrating an exemplary decode output of the sub Sbox of BDD in the fourth embodiment.

Referring to FIG. 25, there is shown an exemplary decode output of sub Sbox of BDD in the fourth embodiment.

An extension section 500 (1111B) shown in FIG. 23 has 2-input NOR gates NR500 through NR504, a 3-input NOR gate NR505, inverters IV500, IV501, decode lines LD500 through LD503.

A first input terminal of the NOR gate NR500 is connected to a supply line of decode data d4 of bits b2, b3 and a second input terminal is connected to a supply line of decode data d6 of bits b2, b3.

An output terminal of the NOR gate NR500 is connected to the decode line LD500 and to the decode line LD501 via the inverter IV500.

A first input terminal of the NOR gate NR501 is connected to a supply line of decode data d16 of bits b8, b9 and a second terminal is connected to a supply line of decode data d17 of bits b8, b9.

An output terminal of the NOR gate 501 is connected to the decode line LD502 and to the decode line LD503 via the inverter IV501.

A first input terminal of the NOR gate NR502 is connected to the decode line LD502 and a second input terminal is connected to the decode line LD500.

A first input terminal of the NOR gate NR503 is connected to the decode line LD503 and a second input terminal is connected to the decode line LD500.

A first input terminal of the NOR gate NR504 is connected to the decode line LD502 and a second input terminal is connected to the decode line LD501.

A first input terminal of the NOR gate NR505 is connected to the decode line LD503, a second input terminal is connected to the supply line of the control signal PC' and a third input terminal is connected to the decode line LD501.

In the extension section 500 decode data d8 through d11 of bits b4, b5 remain unchanged. Likewise, decode data d12 through d15 of bits b6, b7 remain unchanged.

The outputs of the NOR gates NR502 through NR505 become decode data dx3, dx2, dx1, and dx0 of bits b3, b8.

As shown in FIG. 22, in the extension function in a normal binary operation, a 32-bit F function input is divided into 8 4-bit group and each 4-bit group is extended to 6 bits by adding 2 bits to both ends of the 4-bit group, the resultant 6-bit groups being entered into the sub Sboxes.

In the fourth embodiment, an input signal is decoded on a two bits basis.

Hence, as shown in FIG. 23, for four bits, two decode values are used; for the adjacent bits, only necessary bits are taken from the adjacent decode values, the taken bits being decoded for generation.

The output of the extension function is exclusive-ORed with the round key decoded on a two bits basis. For the EXOR operation section 1112B, the one shown in FIG. 10 is used.

In the case of this EXOR operation section 1112B, if there is a delay difference between the two inputs, the output changes in accordance with the later signal change, thereby preventing an intermediate value based on the data changed earlier from being generated.

Of the outputs of the extended function, the decode value generated by a logic operation has a delay compared with the other two decode values. This delay is held unchanged after the EXOR operation with the key. The signal having this delay is used as a switch control signal of the final stage of Sbox, thereby mitigating the delay.

In the case of the fourth embodiment, an input signal to the Sbox 1113B is 2-bit decode data. When this signal is encoded back into binary data, this binary data provides a leak source.

In the fourth embodiment, in order to execute an Sbox operation with a 2-bit decode signal without change, a switch circuit 11130B is used for selecting one of the outputs from four input signals as shown in FIG. 24.

In the configuration, the three switch circuits 11130 shown in FIG. 12 are replaced by one 4-input 1-output switch circuit 11130B.

This switch circuit 11130B executes control that one piece of data to be selected from four inputs by a 2-bit decode signal is selected and the selected piece of data is transmitted to the next switch circuit 11130B.

Therefore, the input signal to the normal Sbox being six bits wide, this signal is supplied as three sets of signals that are decoded every two bits in this fourth embodiment and the Sbox 1113B is configured by three stages of switch circuits 11130B.

The output of the Sbox 1113B is binary data; normally, this output is rearranged by P permutation to provide the output of F function.

In the case of the fourth embodiment, this output of F function is decoded on a two bits basis and the decoded data is entered in the EXOR operation block 113 that executes an EXOR operation with the L register 106A; however, because the data of the signal wiring up to the decode block is binary data, there is a possibility of being DPA-attacked.

A method for overcoming the above-mentioned problem is proposed here in which the circuits for generating the bits of the Sbox 1113B are arranged on the basis of the rearrangement after the P permutation and the generating circuits of the bits to be decoded are arranged side by side as shown in FIG. 25.

Consequently, the signal wiring from each output of the Sbox to the decode block can be minimized, thereby, in turn, minimizing the electric current leak on the signal wiring.

Use of this arrangement configuration causes a problem of increasing the length of the Sbox input signal; however, the Sbox input signal is decode data and therefore the four signals on a decode basis are lengthened in the same manner.

Hence, the charge/discharge currents also increase regardless of data, maintaining the reduction in DPA resistance on a negligible level.

As described, a configuration has been shown in the operation circuit portion of DES is able to operate with decode values.

Likewise, the configuration may be altered so as to operate the operation circuit portion for AES with decode values.

As described and according to the present embodiment, a configuration is used in which a decode value is used for the data that is transmitted over the signal wiring and the operation block is operated by the decode value, thereby minimizing the leak currents on the signal wiring and the operation block to enhance the DPA resistance.

The operating current of the IC is expressed by {the operating current of the IC=a consumed current due to charging/discharging of load wiring+a consumed current due to through-current+a consumed current due to leak}.

The specification of the operating current of the IC is set on the basis of actually measured data of operating current.

With respect to the charge/discharge current components of the specification, if attention is paid to 32 signal lines for example, a value between 0 and 32 is taken as a signal change and the specification is determined from the actual measurement of the 16 signals that is the average of the value and the charge/discharge of the maximum 32 signal lines.

However, if a decode signal decoded in units of two bits is used for example, the number of signals increases to 64, but only one out of four always changes and the number of currents that change are always 16 regardless of binary data, thereby halving the maximum charge/discharge current of the load wiring as compared with the normal configuration.

In the case of cards that operate by generating electric power by receiving magnetism with a coil, the available current is limited and therefore the electric current specification is determined by the maximum operating current, thereby allowing the specification of operating current to be set to a relatively low level.

Figure 26:
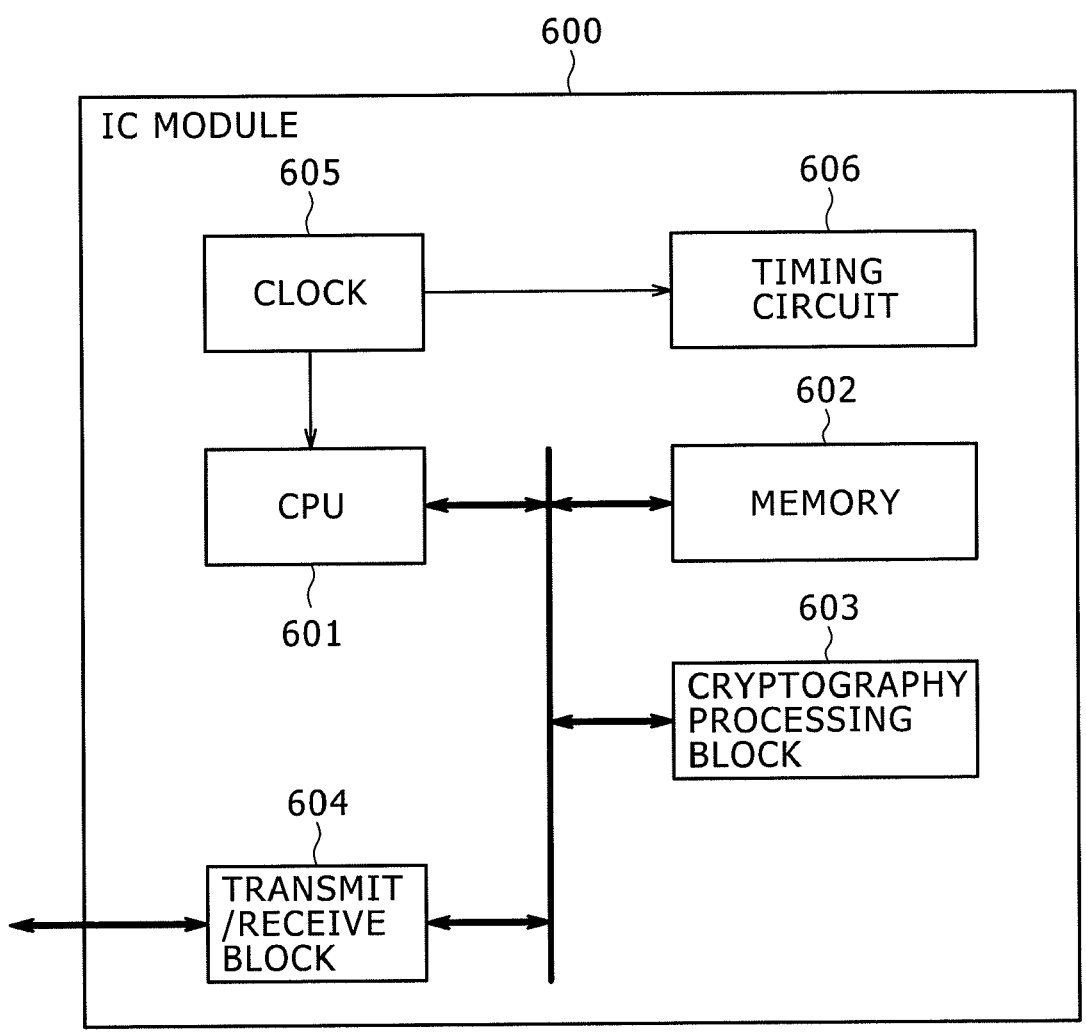
FIG. 26 is a diagram illustrating an exemplary configuration of an IC module as a cryptographic processing execution device to which the configuration of the present invention is applicable.

The following describes an exemplary configuration of an IC module 600 that is a device for executing the above-mentioned cryptographic processing, with reference to FIG. 26.

The above-mentioned processing is executable in various types of information processing apparatuses, such PC, IC card, reader/writer, and so on. The IC module 600 shown in FIG. 26 can be configured into these various types of apparatuses.

In FIG. 26, a CPU (Central Processing Unit) 601 is a processor for starting and ending cryptographic processing, controlling data transmission and reception, controlling data transfer between various configuration blocks, and executing various kinds of programs.

A memory 602 includes a ROM (Read Only Memory) for storing programs to be executed by the CPU 601 and fixed data that are operation parameters.

The memory 602 also has a RAM (Random Access Memory) that stores programs to be executed by the CPU 601 and parameters changing from time to time during the execution and provides a work area in which programs are executed, for example.

In addition, the memory 602 is usable as a storage area for storing key data and so on necessary for cryptographic processing. The storage area for data and so on is preferably configured as a memory having a tamper-proof construction.

A cryptographic processing block 603 is a cryptographic processing apparatus configured to execute cryptographic algorithms including multiple-stage round function repetitive processing, such as the above-mentioned DES algorithm.

To be more specific, the DES operation circuit 100 shown in FIG. 1, the DES operation circuit 100A shown in FIG. 16, the AES operation circuit 150A shown in FIG. 19, and the DES operation circuit 100B shown in FIG. 20 are applied to the cryptographic processing block 603.

A transmit/receive block 604 is a data communication processing block configured to execute data communication with the outside; to be more specific, the transmit/receive block executes data communication with an IC module, such as a reader/writer for example, thereby outputting ciphertexts generated inside the IC module and inputting data from external devices, such as the reader/writer, for example.

It should be noted that various control signals, such as the switching control signal described above, applied in the cryptographic processing block 603, are generated in a timing generation circuit 606 that operates as triggered by a clock signal supplied from a clock generation circuit 605. The generated signals can be supplied to the cryptographic processing block 603.

While preferred embodiments of the present invention have been described using specific terms, such description is for illustrative purpose only, and it is to be understood that changes and variations may be made without departing from the spirit or scope of the following claims.

The present application contains subject matter related to that disclosed in Japanese Priority Patent Application JP 2008-296411 filed in the Japan Patent Office on Nov. 20, 2008, the entire content of which is hereby incorporated by reference.

What is claimed is:

1. A cryptographic processing apparatus comprising:
at least one register configured to store data for operation;
a first operation block configured to execute an operation in accordance with the data stored in said register;
a second operation block configured to execute a logic operation between one of (a) a register-stored value and a key and (b) an operation result of said first operation block; and
a first decode block configured to decode binary data in units of the predetermined number of bits to convert said binary data into decode data having the number of bits higher than the number of bits of said binary data,
wherein an operation result of said second operation block is stored in said register, and
said first decode block is arranged such that data propagating along a signal wiring: from a supply block of at least one of (a) the register-stored value and a round key and (b) said first operation block, to said second operation block is supplied in a state where binary data is decoded in units of the predetermined number of bits to be converted into decode data having the number of bits higher than the number of bits of the binary data,
wherein said register includes a first register and a second register;
said first decode block is arranged for decoding binary data of an input plaintext to convert into said decode data and supplying said decode data selectively to said first register and said second register;
said first operation block executes an operation in accordance with data stored in said second register;
said second operation block executes an exclusive-OR operation between the stored value of said first register and an operation result of said first operation block;
an operation result of said second operation block is stored in said second register; and
a processor and a memory device to execute the blocks.

2. The cryptographic processing apparatus according to claim 1, wherein said decode data is converted such that one of logic "1" and logic "0" stands at different positions for each of said binary data and a remaining position is one of logic "0" and logic "1."

3. The cryptographic processing apparatus according to claim 1, wherein an input block of said first register and an input block of said second register each have a first and second encode block configured to encode said decode data to convert into binary data;
an output block of said first register and an output block of said second register each have a first and second decode and precharge control block configured to decode the binary data stored in said first register and said second register to convert into said decode data;
an input block of said first operation block has a third encode block configured to encode said decode data stored in said second register to convert into binary data; and
an output block of said first operation block has a second decode block configured to decode said operation result to convert into said decode data that is outputted to said second operation block.

4. The cryptographic processing apparatus according to claim 3, wherein one round is formed by a precharge phase and an evaluation phase;
said first and second decode and precharge control block of each of said output block of said first register and said output block of said second register precharges all decode data to a predetermined level in a precharge phase in which a precharge control signal is active; and
said first and second decode and precharge control block executes said decode processing in said evaluation phase.

5. The cryptographic processing apparatus according to claim 1, wherein an input block of said first operation block has a third encode block configured to encode said decode data stored in said second register to convert into binary data; and
an output block of said first operation block has a second decode block configured to decode said operation result to convert into said decode data and outputting said decode data to said second operation block.

6. The cryptographic processing apparatus according to claim 5, wherein one round is formed by a precharge phase and an evaluation phase; and
said first decode and precharge control block of said output block of said first register precharges all decode data to a predetermined level in a precharge phase in which a precharge control signal is active.

7. The cryptographic processing apparatus according to claim 1, wherein said first operation block has an S box as a nonlinear conversion block, said Sbox being formed by a plurality of sub S boxes, an output of said Sbox being decoded with output bits of said plurality of sub Sboxes that are different.

8. The cryptographic processing apparatus according to claim 1, wherein said first operation block has an extension block configured to extend bits of input data; and
an exclusive OR operation block configured to execute an exclusive OR operation between extended data of said extension block and a key on which said decode processing has been executed.

9. The cryptographic processing apparatus according to claim 8, wherein said first operation block has a permutation block configured to permutate bit positions that are an operation result of said exclusive OR operation block; and
an S box configured to execute nonlinear conversion processing on output data of said permutation block.

10. The cryptographic processing apparatus according to claim 1, further comprising:
a fourth encode block configured to encode an operation result decoded after said operation to convert into binary data.

11. A cryptographic processing apparatus according to claim 1, wherein Hamming weights of said decode data are equal to each other.

12. The cryptographic processing apparatus according to claim 1, wherein said cryptographic processing apparatus executes a cryptographic processing operation based on one of a DES (Data Encryption Standard) algorithm and an AES (Advanced Encryption Standard) algorithm.

* * * * *